US012140554B2

(12) United States Patent
Takayama et al.

(10) Patent No.: US 12,140,554 B2
(45) Date of Patent: Nov. 12, 2024

(54) INSPECTION SYSTEM

(71) Applicant: THE NIPPON SIGNAL CO., LTD., Tokyo (JP)

(72) Inventors: Kazuaki Takayama, Kuki (JP); Masaki Takahashi, Kuki (JP); Yutaka Hasebe, Kuk (JP); Eishi Kawasaki, Kuki (JP); Kiyotaka Uchida, Kuki (JP); Chihaya Ogawa, Kuki (JP); Takaharu Ishige, Kuki (JP)

(73) Assignee: THE NIPPON SIGNAL CO., LTD. (JP)

( * ) Notice: Subject to any disclaimer, the term of this patent is extended or adjusted under 35 U.S.C. 154(b) by 229 days.

(21) Appl. No.: 17/772,543

(22) PCT Filed: Oct. 28, 2020

(86) PCT No.: PCT/JP2020/040530
§ 371 (c)(1),
(2) Date: Apr. 28, 2022

(87) PCT Pub. No.: WO2021/085512
PCT Pub. Date: May 6, 2021

(65) Prior Publication Data
US 2022/0404294 A1 Dec. 22, 2022

(30) Foreign Application Priority Data

Oct. 29, 2019 (JP) .................................. 2019-196618
Oct. 26, 2020 (JP) .................................. 2020-179004

(51) Int. Cl.
G01N 23/04 (2018.01)
G01N 23/10 (2018.01)

(52) U.S. Cl.
CPC ............. *G01N 23/04* (2013.01); *G01N 23/10* (2013.01); *G01N 2201/102* (2013.01); *G01N 2201/1235* (2013.01)

(58) Field of Classification Search
None
See application file for complete search history.

(56) References Cited

U.S. PATENT DOCUMENTS

2008/0260096 A1* 10/2008 Sommer .................. G01V 5/22
378/57
2011/0019797 A1* 1/2011 Morton ................ G01N 24/084
378/57
(Continued)

FOREIGN PATENT DOCUMENTS

CN 109030524 A 12/2018
JP 2004-029040 A 1/2004
(Continued)

OTHER PUBLICATIONS

Office Action issued in the corresponding Japanese Patent Application No. 2019-196618; mailed on May 30, 2023 (total 6 pages).
(Continued)

Primary Examiner — Hoon K Song
(74) Attorney, Agent, or Firm — Harness, Dickey & Pierce, P.L.C.

(57) ABSTRACT

A means is provided for enabling easy identification of baggage in which one or more hazardous item is detected. An inspection system is equipped with a first conveyor, inspection device, cover, camera, controller and display. The first conveyor transports baggage to the inspection device. The inspection device captures transmitted-light images of the baggage using light that transmits through the baggage. The cover covers a transport path of the baggage to prevent a hand of a visitor from being inserted into an image shooting area where electromagnetic waves that are harmful (Continued)

to the human body are irradiated. The camera captures visible-light images of the baggage using visible light. The controller controls the first conveyor, inspection device, camera and display. Under control of the controller, the display simultaneously displays a transmitted-light image and a visible-light image of the baggage.

3 Claims, 17 Drawing Sheets

(56) References Cited

U.S. PATENT DOCUMENTS

2013/0156156 A1* 6/2013 Roe ..................... G01V 5/223
378/57
2017/0185842 A1 6/2017 Chen et al.

FOREIGN PATENT DOCUMENTS

| JP | 2018-124084 A | 8/2018 |
| JP | 2018-524561 A | 8/2018 |
| JP | 2019-011981 A | 1/2019 |
| JP | 6568634 B1 | 8/2019 |

OTHER PUBLICATIONS

International Search Report (in English and Japanese) issued in PCT/JP2020/040530, mailed Jan. 19, 2021; ISA/JP (6 pages).
Japanese Office Action issued in corresponding Japanese Application 2020-179004, dated May 28, 2024; (7 pages).

* cited by examiner

INSPECTION SYSTEM

TECHNICAL FIELD

This invention relates to inspection systems.

BACKGROUND ART

As a technique for inspecting objects, Patent Document 1 discloses a technique for efficient baggage inspection by moving at the same speed a floorboard for a baggage and a floorboard for a person who is an owner of the baggage.

PRIOR ART DOCUMENT

Patent Document

Patent Document 1: JP2019-11981A

Problem to be Solved by the Invention

A conventional baggage inspection device used at airports and other locations requires plural attendants who take care of various problems. Moreover, the conventional baggage inspection device transports baggage to be inspected at a slow transport speed, and thus inspection is time-consuming. Recently, targets of terrorist attacks have diversified to include event venues, transportation systems, office buildings, hotels, etc. At those locations, security is not required to be as high as at airports, but baggage inspection needs to be completed more quickly and with higher throughput than at airports.

Many event venues have limited space for baggage inspection devices, and unlike at airports it is difficult to assign a large number of attendants to such devices. Therefore, in order to achieve high-throughput baggage inspection, an inspection device that can be handled by a small number of attendants is required. The conventional baggage inspection device requires plural attendants who perform separate roles, including an attendant to operate the device, an attendant to watch the screen, an attendant to receive baggage from a visitor and place it in the inspection device, and an attendant to pick up the inspected baggage and hand it to the visitor, etc. Accordingly, the conventional baggage inspection device is unable to meet the need for use of a small number of attendants.

To meet the stated need of use of a small number of attendants for baggage inspection, it is necessary to improve inspection efficiency. For example, if the inspection device detects hazardous items in baggage, the attendant will perform a secondary inspection. If the attendant cannot readily identify in which baggage the hazardous items were detected, time is taken for the attendant to find the baggage. As a result, inspection efficiency is compromised.

In view of the background set out above, the purpose of the present invention is to enable easy identification of baggage in which hazardous items are detected.

SUMMARY

The present invention includes, as a first aspect, an inspection system comprising: an inspection device that inspects baggage transported by a belt conveyor, and a camera that uses visible light to capture an image of the baggage approaching the inspection device upstream of the inspection device in a transport direction of the belt conveyor.

According to the first aspect of the invention, an attendant can easily identify baggage in which hazardous items are detected by looking at the image captured by the camera.

The present invention includes, as a second aspect, an inspection system according to the first aspect, wherein the camera is located at a position where the camera is visually shielded from a holder of the baggage when the holder of the baggage is moving alongside the belt conveyor in the transport direction.

According to the second aspect of the invention, a visitor who is the holder of the baggage to be inspected is not caused concern by the presence of the camera.

The present invention includes, as a third aspect, an inspection system according to the first aspect, comprising: a transparent anti-reflective member that transmits visible light and reduces reflection of visible light, located upstream of the inspection device in the transport direction, wherein the camera captures an image of the baggage through the transparent anti-reflective member.

According to the third aspect of the invention, a reflection of the camera does not appear on a light-reflecting member such as a cover, and thus the visitor is not caused concern by a reflection of the camera.

The present invention includes, as a fourth aspect, an inspection system according to the third aspect, comprising: a transparent cover that covers a portion of a belt of the belt conveyor upstream of the inspection device in the transport direction, wherein the transparent anti-reflective member is located on at least one of a top surface and a back surface of the transparent cover.

According to the fourth aspect of the invention, a reflection of the camera does not appear on the transparent cover when the camera is located over the transparent cover.

The present invention includes, as a fifth aspect, an inspection system according to the third aspect, comprising: a transparent cover that is located within a shooting range of the camera, wherein the transparent anti-reflective member is located on at least one of a top surface and a back surface of the transparent cover.

According to the fifth aspect of the invention, a reflection of the camera does not appear on the transparent cover regardless of a position of the camera.

The present invention includes, as a sixth aspect, an inspection system according to the first aspect, comprising: a controller that controls a display to display an image captured by the camera and a result of inspection of the baggage performed by the inspection device simultaneously or by switching between them.

According to the sixth aspect of the invention, an attendant can see both the result of the inspection of baggage and an appearance of the baggage. Therefore, there is no need for another attendant to monitor baggage to be inspected at the entrance side of the inspection device.

The present invention includes, as a seventh aspect, an inspection system according to the sixth aspect, wherein the controller controls the display to display the image captured by the camera and the result of inspection of the baggage by switching between them based on an attribute or a status of the baggage placed on the belt conveyor.

According to the seventh aspect of the invention, an attendant can easily check the attribute or status of baggage.

The present invention includes, as an eighth aspect, an inspection system according to the sixth or the seventh aspect, comprising: a cover that covers a predetermined area from an entrance of the inspection device and upstream in the transport direction, wherein the camera captures an image of an inside of the cover.

According to the eighth aspect of the invention, insertion of into the inspection device of a hand or the like of the visitor is prevented.

The present invention includes, as a ninth aspect, an inspection system according to the eighth aspect, wherein the cover has a non-transparent portion.

According to the ninth aspect of the invention, an attendant can monitor the inside of the cover by looking at images taken by the camera through the cover.

The present invention includes, as a tenth aspect, an inspection system according to the eighth or the ninth aspect, wherein an inner surface of the cover is covered with a material that generates less friction than the inner surface of the cover.

According to the tenth aspect of the invention, the baggage does not easily become stuck in the cover.

The present invention includes, as an eleventh aspect, an inspection system according to the first aspect, comprising a controller that specifies a time when the baggage reaches a predetermined area where the baggage is captured by the camera based on a time when the baggage reaches an inspection area where the baggage is inspected by the inspection device, and associates an image captured by the camera at the specified time with a result of inspection of the baggage performed by the inspection device.

According to the eleventh aspect of the invention, regardless of a size and shape of the baggage, an image captured by the camera at an appropriate time is associated with the result of the inspection of the baggage performed by the inspection device.

The present invention includes, as a twelfth aspect, an inspection system according to the eleventh aspect, wherein the controller specifies a time when the baggage reaches the predetermined area based on a time when a central area of the baggage reaches a reference position in the inspection area.

According to the twelfth aspect of the invention, a risk of failure to detect a hazardous item contained in the main body of the baggage during the inspection is minimized, even if a handle of the bag or the like extends far from the main body in the transport direction.

The present invention includes, as a thirteenth aspect, an inspection system according to the twelfth aspect, wherein the inspection device uses light that transmits through the baggage to capture an image of the interior of the baggage, and the controller adjusts a transport time required for the baggage to be transported from the predetermined area to the inspection area based on a distance between the central area of the baggage shown in an image captured by the inspection device and the reference position in the image captured by the inspection device, and specifies a time when the baggage reaches the predetermined area based on the adjusted transport time.

According to the thirteenth aspect of the invention, the entire baggage is shown in the image taken by the inspection device, and the essential part of the baggage is shown in the center of the image taken by the camera.

The present invention includes, as a fourteenth aspect, an inspection system according to the first aspect, comprising: a controller that specifies a time when the baggage reaches an inspection area where the baggage is inspected by the inspection device based on a time when the baggage reaches a predetermined area where the baggage is captured by the camera, and associates a result of inspection of the baggage performed by the inspection device at the specified time with an image captured by the camera at the time when the baggage reaches the predetermined area.

According to the fourteenth aspect of the invention, regardless of a size and shape of the baggage, a result of inspection performed by the inspection device at an appropriate time is associated with the image of the baggage captured by the camera.

The present invention includes, as a fifteenth aspect, an inspection system according to the fourteenth aspect, wherein the camera repeatedly captures the predetermined area, the controller recognizes the baggage from each image captured by the camera, and when the controller recognizes the baggage from a central area of an image captured by the camera, the controller specifies a time when the image was captured by the camera as a time when the baggage reached the predetermined area.

According to the fifteenth aspect of the invention, compared to the case where a time is used when an edge of the baggage reaches the predetermined area, a more appropriate image is selected from among the images captured by the camera.

The present invention includes, as a sixteenth aspect, an inspection system according to the fourteenth aspect, comprising: a sensor that detects an object, wherein the controller specifies a time when the baggage reaches the predetermined area based on a time period during which the sensor detects the object.

According to the sixteenth aspect of the invention, even if it is difficult to recognize the baggage from the image captured by the camera, the time when the baggage reached the predetermined area is specified.

The present invention includes, as a seventeenth aspect, an inspection system according to the fourteenth aspect, comprising: a mechanism that brings a part of the baggage attached to the baggage and that extends from a main body of the baggage closer to the main body of the baggage upstream of the predetermined area in the transport direction.

According to the seventeenth aspect of the invention, even if a handle or the like extends from the main body of the baggage in the transport direction, the entire baggage is shown in both the image captured by the inspection device and the image captured by the camera, and the essential part of the baggage is shown near the center in both of the images.

DETAILED DESCRIPTION

First Exemplary Embodiment

Figure 1A:
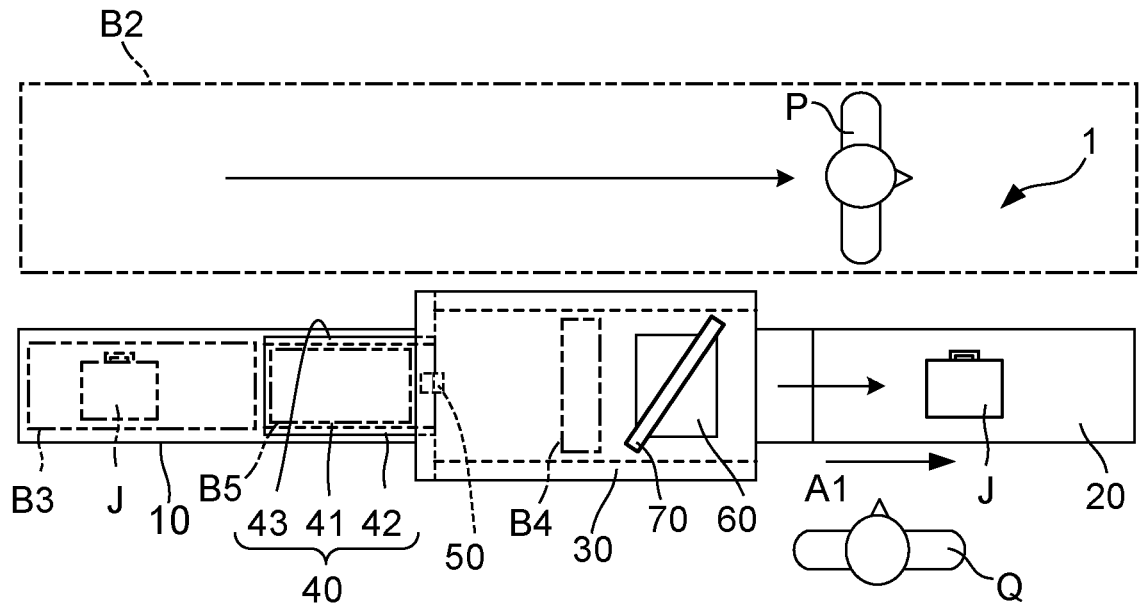
FIG. 1A is a top view of an inspection system according to a first embodiment of the present invention.
Figure 1B:
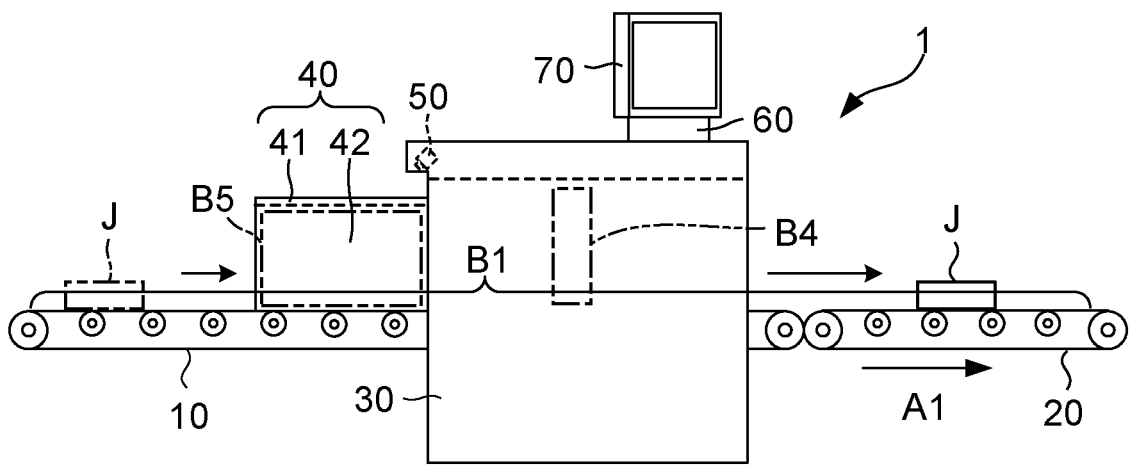
FIG. 1B is a side view of the inspection system according to the first embodiment.

FIG. 1A shows a top view of Inspection System 1 according to a first exemplary embodiment of the present invention, and FIG. 1B shows a side view of Inspection System 1. Hereinafter, FIGS. 1A and 1B are collectively referred to as FIG. 1. Inspection System 1 is a system that inspects baggage of a visitor who visits, for example, an event venue, to ensure that the baggage does not contain any hazardous items such as knives or other hazardous items. FIG. 1 shows an example where Baggage J is an object to be inspected.

Inspection System 1 is used by Visitor P who holds Baggage J and Inspector Q who performs various tasks related to the inspection. In the example shown in FIG. 1, there is one Inspection System 1. However, plural Inspection Systems 1 may be installed depending, for example, on a size of an entrance to the event venue. In the example shown in FIG. 1, there is one Attendant Q. However, plural Attendants Q may be assigned to Inspection System 1.

Inspection System 1 has First Conveyor 10, Second Conveyor 20, Inspection Device 30, Cover 40, Camera 50, Controller 60 and Display 70. First Conveyor 10 and Second Conveyor 20 are both continuously operating belt conveyors that transport Baggage J in Transport Direction A1. First Conveyor 10 and Second Conveyor 20 are arranged side by side in Transport Direction A1 to form Transportation Route B1.

Attendant Q stands by on the left or right side of Transportation Route B1. Located on the side opposite to Attendant Q across Transportation Route B1, is Inspection Lane B2 through which Visitor P passes. First Conveyor 10 is located upstream of Second Conveyor 20 in Transport Direction A1. First Conveyor 10 has Loading Area B3 in which Visitor P places Baggage J on the belt of First Conveyor 10. Cover 40 is located downstream of Transportation Route B1 in Transport Direction A1, and Inspection Device 30 is located further downstream of Cover 40 in Transport Direction A1.

Inspection Device 30 is a device that takes a transmitted-light image of an inspection object by light that transmits through the inspection object. The transmitted-light image shows a result of inspection by Inspection Device 30, and is used by Attendant Q to check whether the inspection object contains any hazardous items. Inspection Device 30 irradiates transmitted-light to Baggage J that has reached Image Shooting Area B4 in Inspection Device 30, and generates a transmitted-light image of Baggage J as an image formed by shading in accordance with an intensity of the transmitted-light transmitted through Baggage J. The transmitted-light that Inspection Device 30 irradiates to Baggage J consists of electromagnetic waves such as X-rays in a frequency band such that the waves transmit through objects at different transmission rates depending on a type of object contained in Baggage J.

If it is determined that hazardous items may be contained in Baggage J during a primary inspection based on the transmitted-light image taken by Inspection Device 30, Attendant Q opens Baggage J to check the contents of Baggage J as a secondary inspection. A decision of whether the secondary inspection is necessary is made by Controller 60 based on the transmitted-light image. Details of how Controller 60 makes the decision are explained later.

Cover 40 is located upstream in Transport Direction A1 from Image Shooting Area B4 of Inspection Device 30. Cover 40 is made of a transparent material and covers the transport path of Baggage J to prevent a hand of Visitor P from entering Image Shooting Area B4, where electromagnetic radiation harmful to the human body may be irradiated. Cover 40 is an example of a "transparent cover" of the present invention.

Cover 40 has Top Section 41, Right-side Section 42 and Left-side Section 43. Each of Top Section 41, Right-side Section 42 and Left-side Section 43 is a rectangular plate. A shape of cross section perpendicular to Transport Direction A1 of Cover 40 is a U-shaped. Interior Space B5 of Cover 40 is large enough for Baggage J to pass through. Camera 50 is located at the upstream edge of Inspection Device 30 in Transport Direction A1, overlooking Top Section 41.

Figure 2:
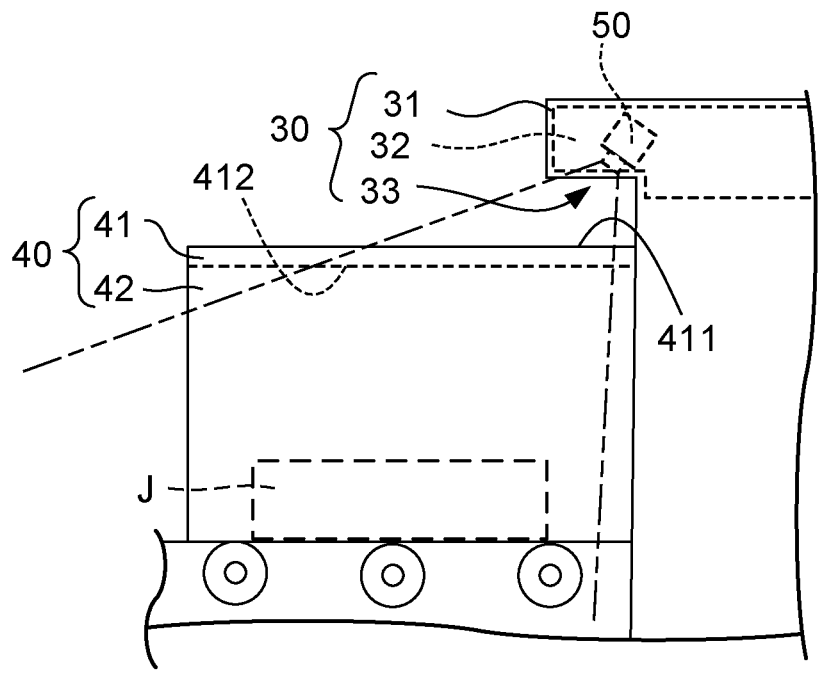
FIG. 2 is an enlarged view of the inspection system according to the first embodiment, showing parts around a camera.

FIG. 2 shows an enlarged view of Inspection System 1, showing parts around Camera 50. Camera 50 captures a visible-light image showing an appearance of Baggage J being transported by First Conveyor 10. Camera 50 is located in Interior Space 32 of Housing 31 of Inspection Device 30, and captures an image of the exterior space through Opening 33, which opens vertically downward of Housing 31. Camera 50 captures a visible-light image of Baggage J moving through the exterior space on the entrance side of Inspection Device 30.

With the arrangement shown in FIG. 2, Housing 31, which is part of Inspection Device 30, functions as a shield that hides Camera 50 from Visitor P who passes through Inspection Lane B2. If Visitor P looks at Opening 33 from below, a portion of Camera 50 may be visible to Visitor P, but most of Camera 50 is not visible to Visitor P. If Visitor P looks down at Housing 31 from a position higher than Housing 31, Camera 50 is entirely hidden from Visitor P.

Thus, Camera 50 is located to be visually shielded from Visitor P passing through Inspection Lane B2. If Camera 50 is visible to Visitor P, Visitor P may feel concern about image capture. In this embodiment, since Camera 50 is hidden from Visitor P by Housing 31 as shown in FIG. 2, Visitor P does not feel any such concern.

Camera 50 captures through Top Section 41 of Cover 40 a visible-light image of Baggage J moving through Interior Space B5. Top Section 41 is made of a transparent material that transmits visible light. Top Surface 411 of Top Section 41 facing toward Camera 50 is processed to suppress reflection of light.

Top Surface 411, for example, has an anti-reflective film applied to it. The anti-reflective film is, for example, a two-layer film, in which light reflected by the two layers is in opposite phase and cancels out due to interference, thereby suppressing reflection. Alternatively, the anti-reflective film may be a film formed with minute irregularities on its surface to scatter light and suppress reflection, or may be a film formed with two layers and minute irregularities.

The anti-reflective film is a transparent member that prevents reflection of light, and is an example of a "transparent anti-reflective member" of the present invention. Thus, Camera 50 captures a visible-light image of the appearance of Baggage J through the transparent anti-reflective member of Cover 40, which is located on the entrance side of Inspection Device 30.

The transparent anti-reflective member may be provided not only on Top Surface 411 of Cover 40, but also on Back Surface 412 of Cover 40, or only on Back Surface 412. The transparent anti-reflective member suppresses reflection of Camera 50 onto Cover 40. In addition, the transparent anti-reflective member improves a clarity of image of Baggage J captured through Cover 40.

If Camera 50 is reflected in Cover 40, Visitor P may become aware of the presence of Camera 50, which, as mentioned above, may cause concern to Visitor P. According to Inspection System 1, since reflection is suppressed, Visitor P of Baggage J is not aware of Camera 50 and thus is not caused concern.

Not only Top Section 41 of Cover 40, but also Right-side Section 42 and Left-side Section 43 may be provided with transparent anti-reflective members. In addition to the surfaces of Right-side Section 42 and Left-side Section 43, transparent anti-reflective members may be provided on their back surfaces (Interior Space B5 side). Any of the surfaces may be provided with a transparent anti-reflective member by processing the surface to be integrated in the same structure to which the anti-reflective film is attached. In this case, the anti-reflective film is not attached.

As described above, Cover 40 also has transparent anti-reflective members on its sides. This prevents the baggage holder from being reflected in the transparent cover, which would make it difficult to see the baggage. After Baggage J reaches the downstream end of First Conveyor 10 in Transport Direction A1, Baggage J is subsequently transported in Transport Direction A1 by Second Conveyor 20.

Visitor P moves forward through Inspection Lane B2 along Transportation Route B1 to Second Conveyor 20, and picks up Baggage J from Second Conveyor 20. A transport speed of Second Conveyor 20 is slower than that of First Conveyor 10. Therefore, Visitor P can easily pick up Baggage J from Second Conveyor 20. However, when the secondary inspection described above is required, Attendant Q, not Visitor P, picks up Baggage J from Second Conveyor 20.

Following is a description of a method used by Controller 60 to determine whether secondary inspection is required for Baggage J. Controller 60 is a device that controls operation of each device of Inspection System 1. Controller 60 is a computer equipped with a processor such as a central processing unit (CPU), a memory, a storage, a communication unit, etc. Controller 60 is electrically connected to First Conveyor 10, Second Conveyor 20, Inspection Device 30 and Display 70 by signal lines.

Controller 60 controls operations of each device of Inspection System 1 while exchanging data with each device. Controller 60 performs an inspection process to check whether Baggage J contains hazardous items. The inspection process performed by Controller 60 includes an image-shooting process and a judgment process. The image-shooting process is a process to control Inspection Device 30 to generate a transmitted-light image of Baggage J when it is in Image Shooting Area B4. The judgment process is a process to judge, based on the transmitted-light image generated in the image-shooting process, whether Baggage J is likely to contain hazardous items, i.e., whether secondary inspection by Attendant Q is required.

Controller 60 analyzes shapes of items shown in the transmitted-light image using well-known image analysis methods, and judges whether there are any hazardous items by use of pattern matching or other methods based on the analyzed shapes of the items. Display 70 displays a result of the judgment, the transmitted-light image and the visible-light image of Baggage J under control of Controller 60.

Figure 3:
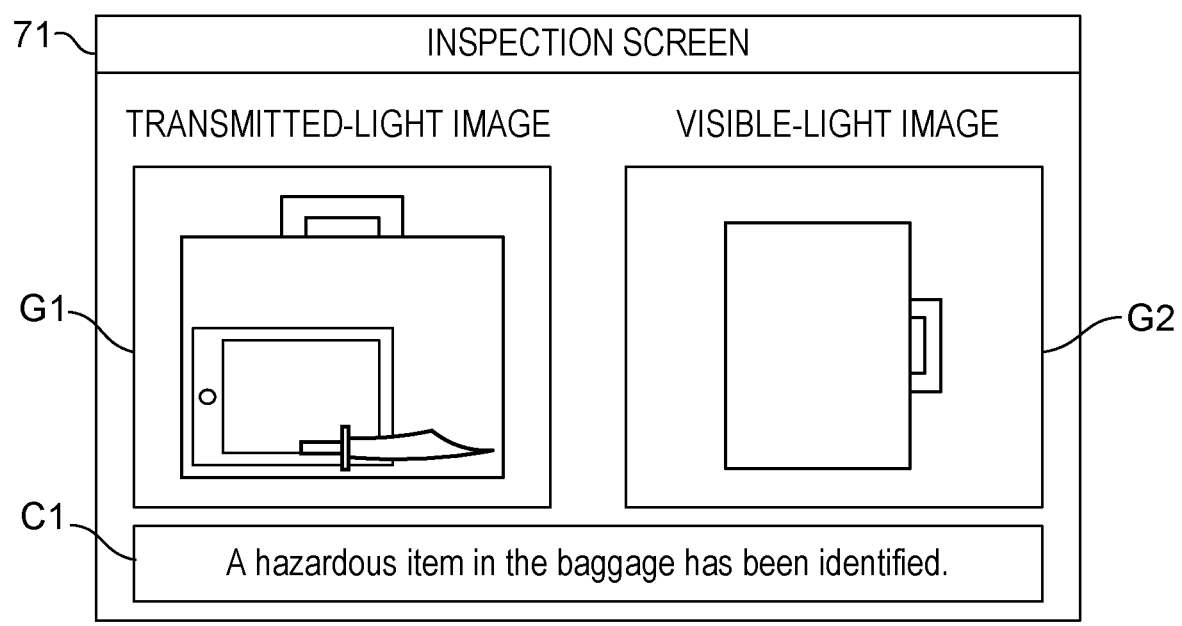
FIG. 3 shows an example of a screen showing a transmitted-light image and a visible-light image of baggage displayed by the inspection system according to the first embodiment.

FIG. 3 shows an example of a screen displayed by Display 70 showing the transmitted-light image and the visible-light image. In the example shown in FIG. 3, Display 70 displays a transmitted-light image of Baggage J in Area G1, a visible-light image of Baggage J in Area G2, and a result of the judgment in Area C1 on Display Surface 71 under control of Controller 60. In Area C1, a message such as "A hazardous item in the baggage has been identified." is displayed. In the example shown in FIG. 3, a knife-shaped item in Baggage J is identified as a hazardous item.

Controller 60 analyzes a visible-light image taken by Camera 50 to recognize Baggage J transported on Transportation Route B1. Controller 60 determines that the visible-light image taken by Camera 50 at a timing prior to and closest to a timing when the transmitted-light image was taken by Inspection Device 30 is the visible-light image of the baggage also shown in the transmitted-light image. Then, Display 70 displays the visible-light image in Area G2 together with the transmitted-light image in Area G1 under control of Controller 60.

As described above, Inspection System 1 transports Baggage J, takes a transmitted-light image and a visible-light image of Baggage J, and simultaneously displays the transmitted-light image and the visible-light image. Display 70 is located where it can be viewed by Attendant Q who picks up Baggage J, as shown in FIG. 1.

According to Inspection System 1, when Attendant Q is at the location where Baggage J is picked up, Attendant Q can easily specify a baggage for secondary inspection by looking at the visible-light image displayed by Display 70 upon judging that the baggage may include hazardous items by looking at a transmitted-light image also displayed by Display 70.

Transportation Route B1 is positioned at about the height of a waist of a visitor of average body size so that the visitors can easily place their baggage on Transportation Route B1 and pick up their baggage from Transportation Route B1; and Attendant Q is able to look down at the baggage on Transportation Route B1 from above. In this embodiment, Camera 50 also takes a visible-light image of the baggage from above. Accordingly, Attendant Q can easily identify the baggage shown in the visible-light image.

MODIFIED EXAMPLES OF FIRST EXEMPLARY EMBODIMENT

The first embodiment described above is an exemplary implementation of the present invention, and may be modified in various ways. The following are modified examples of the first embodiment. Two or more of the following modified examples may be combined as needed.

Modified Example 1

Figure 4:
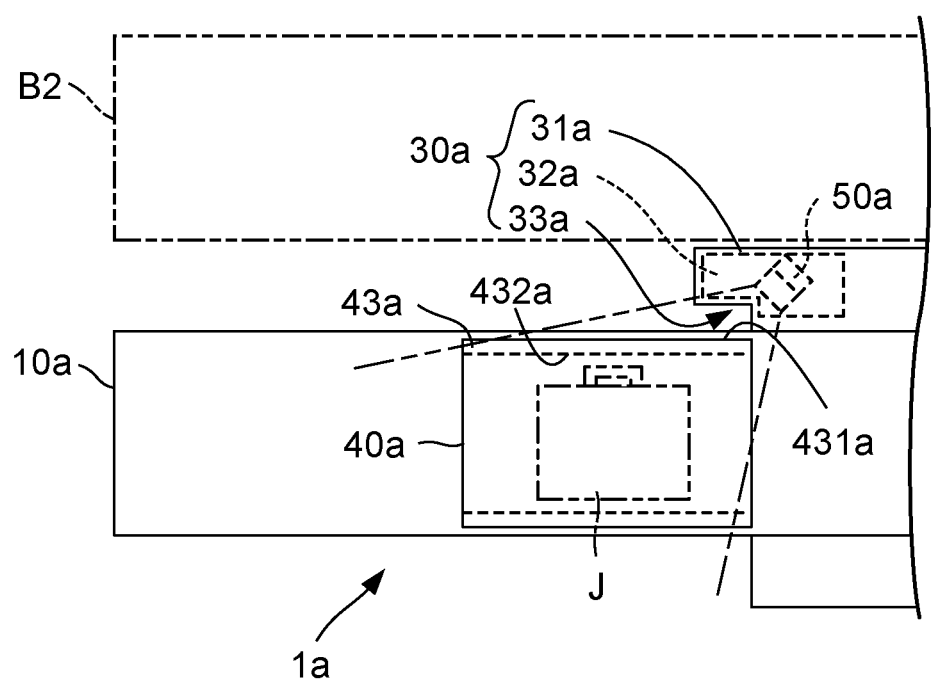
FIG. 4 is an enlarged view of an inspection system according to a modified example of the first embodiment, showing parts around a camera.

A location of Camera 50 that captures a visible-light image of baggage may be different from that in the above-described embodiment. FIG. 4 shows an enlarged view of parts around Camera 50a of Inspection System 1a according to this modified example. FIG. 4 shows Camera 50a and other members of Inspection System 1a near Camera 50a as seen from above. Camera 50a shoots Baggage J transported by First Conveyor 10a from the upper left to generate a visible-light image of Baggage J.

Camera 50a is located in Interior Space 32a of Housing 31a of Inspection Device 30a. Interior Space 32a is located on the side of Inspection Lane B2 of Housing 31a. Interior Space 32a has Opening 33a that faces Cover 40a. Camera 50a takes a visible-light image of the exterior space through Opening 33a. Thus, Camera 50a is located at a position that is not visible to Visitor P passing through Inspection Lane B2.

As a result, Visitor P does not feel concern about image capture, as is the case in the above-described embodiment. Camera 50a shoots a visible-light image showing Baggage J from the upper left through Left-side Section 43a of Cover 40a.

In this modified example, a transparent anti-reflective member such as anti-reflective film is provided on either of or both of the top surface and back surface of Cover 40a that is located within a shooting range of Camera 50a. In the example shown in FIG. 4, transparent anti-reflective members are provided on either of or on both of Top Surface 431a and Back Surface 432a of Left-side Section 43a of Cover 40a.

As a result, as is the case in the above-described embodiment, Visitor P is less likely to be aware of Camera 50a, and a likelihood that Visitor P may feel concern about image capture is minimized. In addition, since a transparent anti-reflective member is provided on Cover 40a, which is located within the shooting range of Camera 50a, a reflection of Camera 50a on Cover 40a is suppressed.

Modified Example 2

In the above-described embodiment, Housing 31 of Inspection Device 30 is used as a shield to hide Camera 50 from Visitor P, but the shield that hides Camera 50 from Visitor P is not limited to Housing 31. For example, Camera 50 may be located outside Housing 31 of Inspection Device 30, such as on Cover 40, and a cover may be provided that hides Camera 50 from Visitor P.

In either case, it is preferable for Camera 50 to be at least partially hidden by a shield from a visitor passing through Inspection Lane B2. By providing such a shield, as in the case of the above-described embodiment, it is possible to avoid causing Visitor P concern due to the existence of Camera 50. By using a part of Inspection Device 30, which is a device that takes transmitted-light images, as a shield as is the case in the above-described embodiment, Camera 50 can be made invisible to Visitor P more naturally than if a separate shield is provided.

Modified Example 3

In the above-described embodiment, Inspection System 1 is used at an event venue. The place where Inspection System 1 is used is not limited to an event venue, and Inspection System 1 may be used at any place where it is necessary to ensure that baggage held by a visitor entering the place does not contain any hazardous item. For example, Inspection System 1 may be used at entrances of airports, train stations, ports and bus terminals, concert venues, sports stadiums, museums, etc.

Modified Example 4

In the above-described embodiment, Inspection System 1 is equipped with two conveyors. The number of conveyors is not limited to two. For example, Inspection System 1 may be equipped with only one conveyor. In such a case, a transport speed of the conveyor may be kept constant at all times, or its speed may be increased while baggage moves through Image Shooting Area B4 and decreased after the baggage moves through Image Shooting Area B4.

Second Exemplary Embodiment

Configuration of Inspection System

Figure 5:
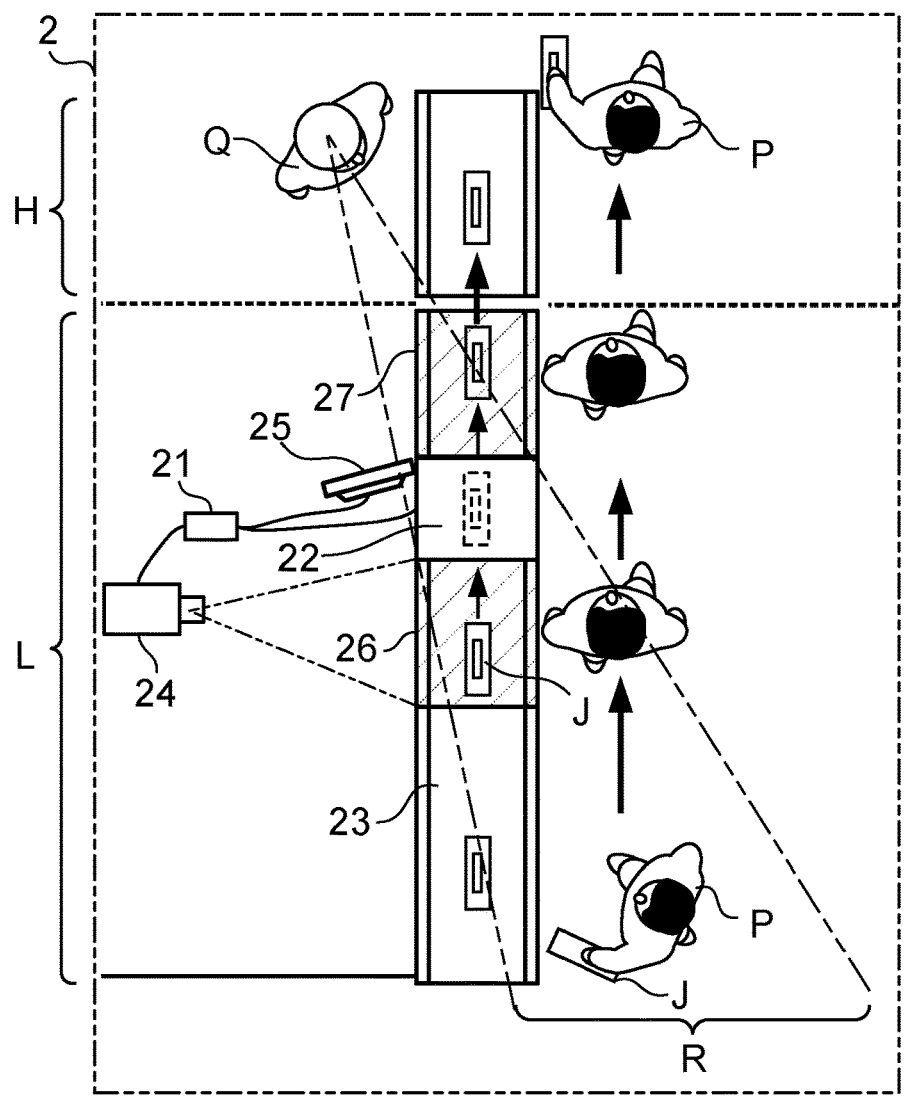
FIG. 5 is a top view of an inspection system according to a second embodiment of the present invention.

FIG. 5 shows a top view of Inspection System 2 according to a second exemplary embodiment of the present invention. Inspection System 2 is a system that inspects baggage of visitors who are about to enter a public space, such as a transportation facility, a concert hall, a public hall, etc.

Inspection System 2 inspects Baggage J of Visitor P who is about to move from Outside L to Inside H in the direction depicted by the arrows shown in FIG. 5. Inspection System 2 is equipped with Controller 21, Inspection Device 22, Conveyor 23, Camera 24 and Display 25.

Controller 21 controls operations of each component of Inspection System 2. Controller 21 is equipped with an arithmetic processing unit such as a Central Processing Unit (CPU) and storage devices such as a Read Only Memory (ROM), a Random Access Memory (RAM), a solid state drive, and a hard disk drive. The arithmetic processing unit of Controller 21 executes programs stored in the storage devices of Controller 21.

Inspection Device 22 is a device that continuously inspects baggage transported by Conveyor 23 by, for example, irradiating X-rays, under control of Controller 21. In FIG. 5, an entrance where Baggage J for inspection is placed on Conveyor 23 is shown on the lower side, and an exit where Baggage J after inspection is picked up is shown on the upper side.

Conveyor 23 transports Baggage J placed by Visitor P in the transport direction depicted by the arrows in FIG. 5. First, Conveyor 23 transports Baggage J placed by Visitor P to an entrance of Inspection Device 22. Conveyor 23 further transports Baggage J to move through the inside of Inspection Device 22, and then further transports Baggage J downstream of Inspection Device 22 to the area where Baggage J is picked up by Visitor P. Conveyor 23 is, for example, a belt conveyor.

Conveyor 23 may consist of a single conveyor, or may consist of plural conveyors that move in coordination with each other at different locations, for example, upstream of Inspection Device 22, inside Inspection Device 22, and downstream of Inspection Device 22.

As shown in FIG. 5, Cover 26 is provided over a predetermined area above Conveyor 23 upstream from the entrance of Inspection Device 22. Also as shown in FIG. 5, Cover 27 is provided over a predetermined area above Conveyor 23 and downstream from the exit of Inspection Device 22. Both Cover 26 and Cover 27 are made of a transparent material, and an inside each of Cover 26 and Cover 27 can be seen from the outside each of Cover 26 and Cover 27, respectively.

Camera 24 is an imaging device that captures images of an object. For example, Camera 24 is a digital still camera equipped with an optical system including a lens, reflector, prism, etc., and an imaging sensor such as a Complementary Metal Oxide Semiconductor (CMOS) or a Charge Coupled Device (CCD).

Camera 24 captures an image of Inspection Device 22 together with Baggage J when Baggage J is about to enter Inspection Device 22, and provides to Controller 21 image data showing the captured image (hereinafter referred to as Entrance Image S1).

Inspection Device 22 irradiates inspection light that transmits through Baggage J, and provides image data to Controller 21 showing an image represented by the inspection light transmitted through Baggage J (hereinafter referred to as Inspection Image S2).

Display 25 has a display such as a liquid crystal display, and displays images under control of Controller 21. Display 25 may be a touch screen equipped with a transparent touch panel superimposed on the display panel that accepts operations by sensing a touch of a finger or the like.

When Controller 21 receives image data from Camera 24 showing Entrance Image S1, Controller 21 instructs Display 25 to display Entrance Image S1 based on the image data. Display 25 displays Entrance Image S1 in response to the instruction from Controller 21.

When Controller 21 receives image data showing Inspection Image S2 from Inspection Device 22, Controller 21 instructs Display 25 to display Entrance Image S2 based on the image data. Display 25 displays Entrance Image S2 in response to the instruction from Controller 21.

Display 25 is arranged so that its display surface faces Attendant Q, who is positioned at the exit side of Inspection Device 22. Attendant Q can thus see Entrance Image S1 and Inspection Image S2 displayed by Display 25.

Operation of Inspection System

An example of operation of Inspection Image S2 is described below. If Inspection Image S2 indicates that Baggage J may contain a hazardous item, Attendant Q, who is positioned at the exit side of Inspection Device 22, performs a secondary inspection of Baggage J by requesting Visitor P, who is moving from Outside L to Inside H, to remain where they are opening Baggage J to check its contents. Attendant Q can see the exit of Inspection Device 22 through Cover 27, but cannot see the entrance of Inspection Device 22 because it is hidden by Inspection Device 22.

Camera 24 captures an image of the entrance of Inspection Device 22 through Cover 26 and supplies image data showing Entrance Image S1 to Controller 21. Controller 21 controls Display 25 to display Entrance Image S1 shown by the image data supplied from Camera 24. Attendant Q checks whether Baggage J contains any hazardous items by looking at Inspection Device 22 displayed on Display 25. At the same time, Attendant Q monitors the entrance of Inspection Device 22 by looking at Entrance Image S1 also displayed on Display 25.

Figure 6:
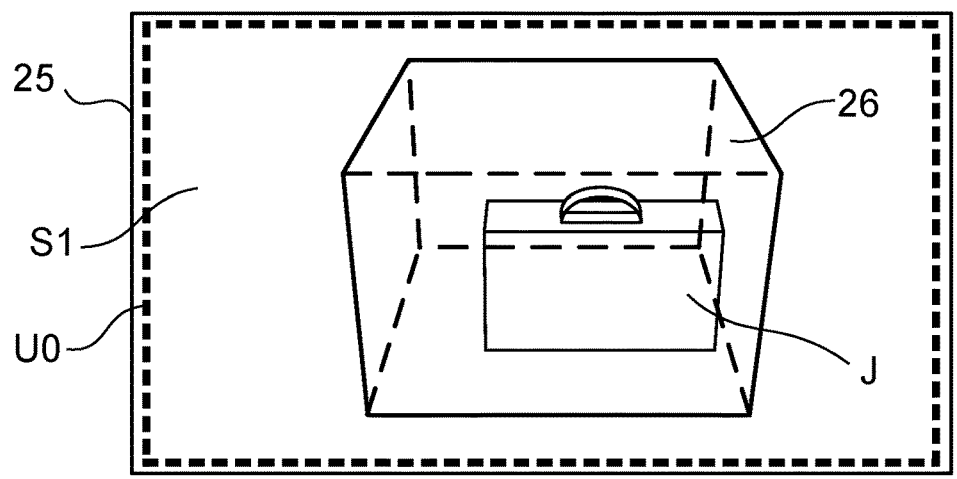
FIG. 6 shows an example of a screen displayed by the inspection system according to the second embodiment showing an image taken facing the entrance of the inspection device when no hazardous item is detected.

FIG. 6 shows an example of Entrance Image S1 displayed on Display 25 when Inspection Device 22 does not detect any hazardous items in Baggage J. Controller 21 instructs Display 25 to display Entrance Image S1 supplied from Camera 24 when Inspection Device 22 does not detect any hazardous items in Baggage J, i.e. under normal conditions. In response to the instruction, Display 25 displays Entrance Image S1 as shown in FIG. 6.

Entrance Image S1 is an image taken by Camera 24 of Baggage J being transported inside Cover 26. In the example shown in FIG. 6, Display 25 displays Entrance Image S1 over all of Area U0 of its display surface. Attendant Q monitors Entrance Image S1 displayed on Display 25 to check for abnormalities such as whether Baggage J is jammed at the entrance of Inspection Device 22, whether Visitor P is trying to put his/her hand or other objects into Inspection Device 22, etc.

When Inspection Device 22 detects a hazardous item in Baggage J, Controller 21 receives image data showing Inspection Image S2, which is an inspection result from Inspection Device 22. Controller 21 instructs Display 25 to display Inspection Image S2 shown by the image data from Inspection Device 22. In response to the instruction, Display 25 displays Inspection Image S2 instead of Entrance Image S1.

Figure 7:
FIG. 7 shows an example of a screen displayed by the inspection system according to the second embodiment when a hazardous item is detected.

FIG. 7 shows an example of Inspection Image S2 displayed on Display 25 when Inspection Device 22 detects a hazardous item in Baggage J. Inspection Device 22 generates Inspection Image S2 by irradiating inspection light such as X-rays, and recognizes contents of Baggage J from Inspection Image S2. When Inspection Device 22 recognizes a hazardous item, such as a knife, from Inspection Image S2, Inspection Device 22 supplies Controller 21 with image data showing an image with a warning message (e.g., "WARNING!") added to Inspection Image S2.

When Controller 21 receives the image data showing Inspection Image S2 with the warning message from Inspection Device 22, Controller 21 instructs Display 25 to display Inspection Image S2 with the warning message. In response to the instruction, Display 25 displays Inspection Image S2 with the warning message instead of Entrance Image S1 as shown in FIG. 7.

Inspection System 2 captures images of the interior of Cover 26 with Camera 24, and Entrance Image S1 is displayed on Display 25 in real time. Thus, Attendant Q can check for abnormalities such as whether Baggage J being transported by Conveyor 23 is jammed at the entrance of Inspection Device 22, whether Visitor P is trying to put his/her hand inside Inspection Device 22, etc. When Inspection Device 22 detects a hazardous item, Display 25 switches the displayed image from Entrance Image S1 to Inspection Image S2. Accordingly, Attendant Q need only monitor the screen of Display 25.

According to Inspection System 2, it is necessary for only one Attendant Q to be present at the exit side of Inspection Device 22, and there is no need for another attendant to monitor the entrance side of Inspection Device 22.

Modified Examples of Second Exemplary Embodiment

The second embodiment described above is an exemplary implementation of the present invention, and may be modified in various ways. Following are modified examples of the second embodiment. Two or more of the following modified examples may be combined as needed.

Modified Example 1

In the second embodiment described above, Inspection Device 22 supplies Inspection Image S2 to Controller 21 only when hazardous items are recognized from Inspection Image S2. Inspection Device 22 may supply Inspection Image S2 to Controller 21 even when it does not recognize hazardous items from Inspection Image S2.

For example, when Controller 21 receives Inspection Image S2 from Inspection Device 22, Controller 21 instructs Display 25 to switch the image to be displayed from Entrance Image S1 to Inspection Image S2 for a certain period of time, and then switch the image to be displayed from Inspection Image S2 to Entrance Image S1. In response to the instruction, Display 25 displays Inspection Image S2 for a certain period of time when Inspection Device 22 generates Inspection Image S2.

Figure 8:
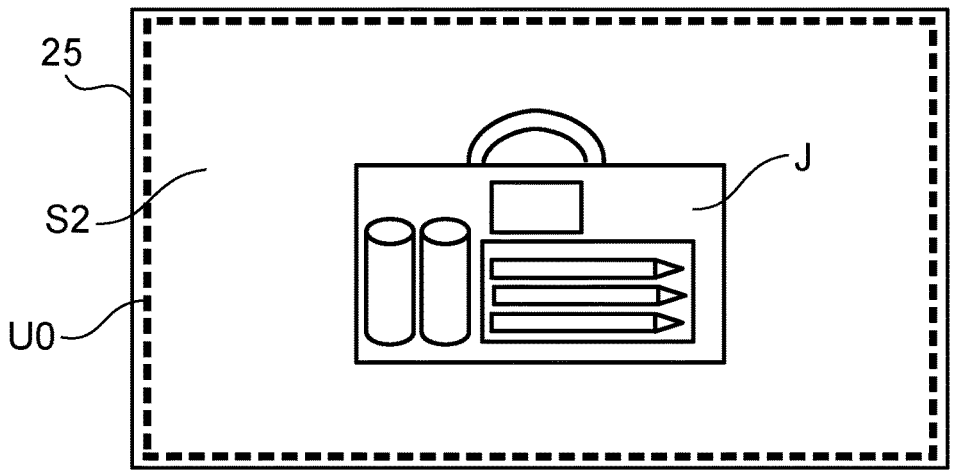
FIG. 8 shows an example of a transmitted-light image displayed by the inspection system according to a modified example of the second embodiment when a result of inspection becomes available.

FIG. 8 shows an example of screen displayed on Display 25 when Inspection Device 22 does not recognize any hazardous items from Inspection Image S2. Attendant Q looks at Inspection Image S2 displayed on Display 25 regardless of whether Inspection Device 22 has recognized any hazardous item, to check whether the baggage contains any hazardous item. As a result, even if Inspection Device 22 fails to recognize a hazardous item in Inspection Image S2, Attendant Q may recognize a hazardous item.

Modified Example 2

Figure 9:
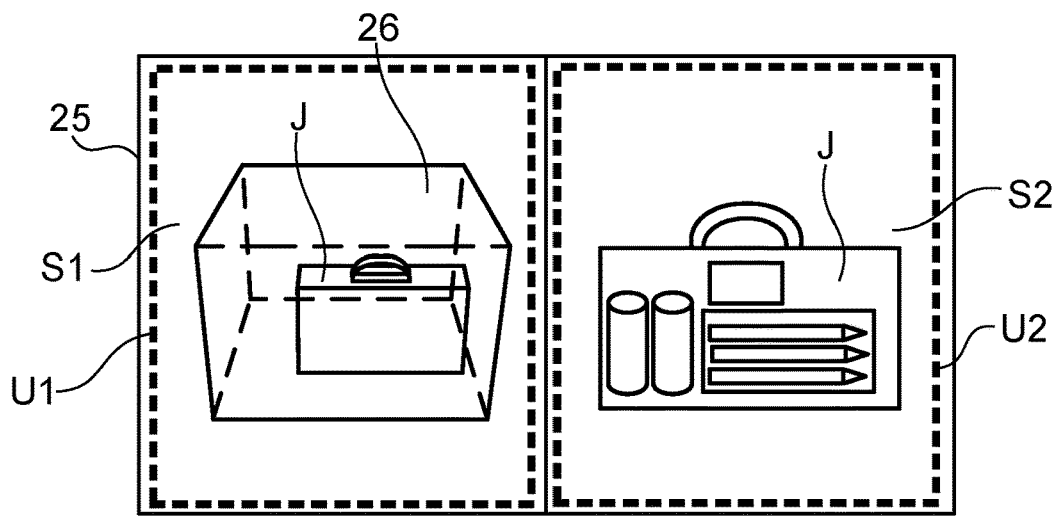
FIG. 9 shows an example of a screen showing a visible-light image and a transmitted-light image displayed by the inspection system according to a modified example of the second embodiment.

In the second embodiment described above, Controller 21 instructs Display 25 to switch between display of Entrance Image S1 and Inspection Image S2. Alternatively, Controller 21 may instruct Display 25 to display Entrance Image S1 and Inspection Image S2 simultaneously. FIG. 9 shows an example of a screen showing Entrance Image S1 and Inspection Image S2 simultaneously displayed by Display 25. In the example shown in FIG. 9, Entrance Image S1 is displayed in Area U1 on the left side of the screen and Inspection Image S2 is displayed in Area U2 on the right side of the screen. Attendant Q can look at the screen and check Entrance Image S1 and Inspection Image S2 at the same time.

Modified Example 3

When Display 25 simultaneously displays Entrance Image S1 and Inspection Image S2, a size, position, shape, border thickness, color, flicker, and other attributes of each image may be different.

For example, Display 25 simultaneously displays Entrance Image S1 and Inspection Image S2 in different sizes. In this case, it is preferable for Display 25 to display the image that Attendant Q should monitor more carefully in a larger size.

Accordingly, Display 25 normally displays Entrance Image S1 in a larger size than Inspection Image S2; but when a hazardous item is detected by Inspection Device 22, Display 25 displays Inspection Image S2 in a larger size than Entrance Image S1.

As a result, Attendant Q can monitor Entrance Image S1 more carefully than Inspection Image S2 when hazardous items are not detected, and Inspection Image S2 more carefully than Entrance Image S1 when hazardous items are detected.

Modified Example 4

When Display 25 simultaneously displays Entrance Image S1 and Inspection Image S2 on its screen, it may switch the images to be displayed in each of the two divided areas depending on whether any hazardous items have been detected by Inspection Device 22.

For example, Display 25 has a large area on the left side of its screen and a narrow area on the right side of its screen. Display 25 displays Entrance Image S1 in the large area on the left and Inspection Image S2 in the narrow area on the right when no hazardous items are detected. When hazardous items are detected, Display 25 switches the left and right images for a predetermined period of time.

As a result, Attendant Q can also monitor Entrance Image S1 more carefully than Inspection Image S2 when hazardous items are not detected, and Inspection Image S2 more carefully than Entrance Image S1 when hazardous items are detected.

Modified Example 5

In the embodiment described above, Controller 21 instructs Display 25 to switch the image to be displayed when Inspection Device 22 detects hazardous items from Inspection Image S2. In other words, in the embodiment described above, Controller 21 switches the image to be displayed on Display 25 based on a result of an inspection of Baggage J performed by Inspection Device 22. Alternatively, Controller 21 switches the image to be displayed on Display 25 based on attributes or a status of Baggage J placed on Conveyor 23.

Figure 10:
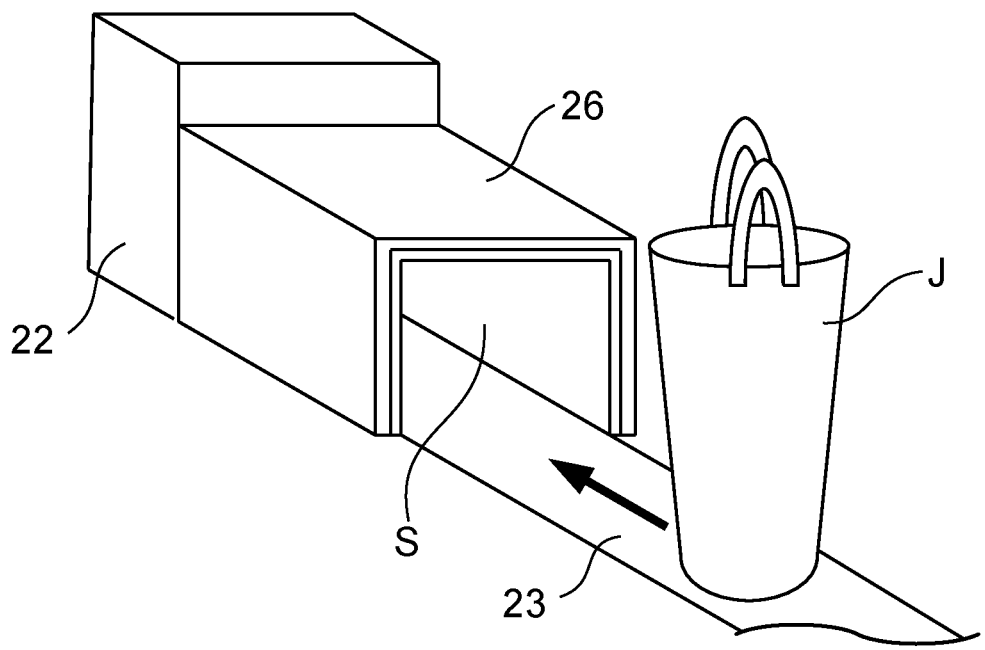
FIG. 10 shows an example of a state of an inspection system according to a modified example of the second embodiment where baggage is placed on a conveyor of the inspection system.

FIG. 10 shows an example of a state of Baggage J placed on Conveyor 23. Baggage J shown in FIG. 10 is a tote bag a height of which is greater than that of Cover 26. As shown in FIG. 10, Cover 26 is located over Conveyor 23 on the entrance side of Inspection Device 22. Conveyor 23 transports Baggage J placed on the belt of Conveyor 23 in the direction depicted by the arrow shown in FIG. 10, moving it through Transport Space S enclosed by Cover 26 and Conveyor 23 to reach the entrance of Inspection Device 22.

Baggage J shown in FIG. 10 cannot enter the entrance of Cover 26 and is likely to become stuck there.

Figure 11:
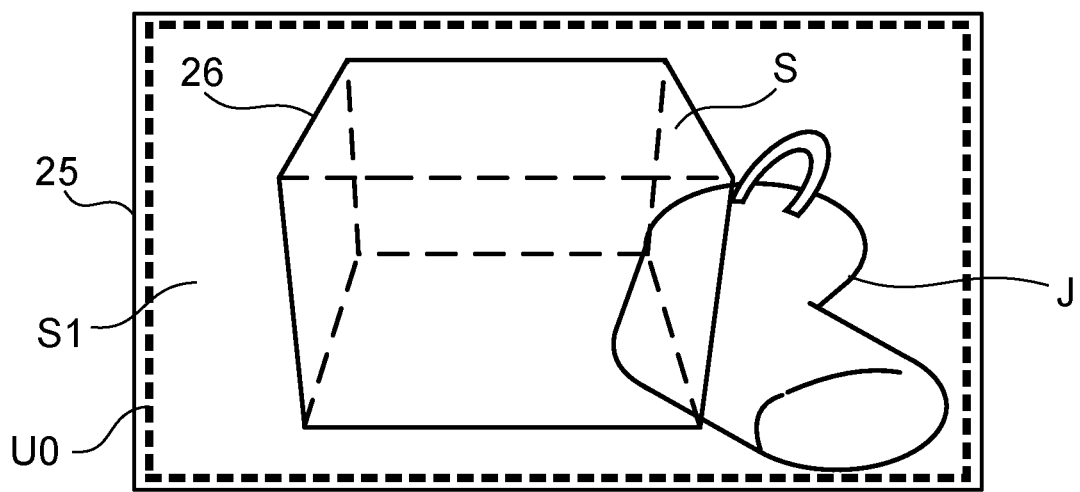
FIG. 11 shows an example of a visible-light image that is displayed by an inspection system according to a modified example of the second embodiment when a problem exists with placement of the baggage.

FIG. 11 shows an example of Entrance Image S1 taken when Baggage J is stuck in the entrance of Cover 26. In this case, Baggage J overturns before entering Transport Space S and is not transported in the transport direction and is impeded by contact with the upstream end of Cover 26, as shown in FIG. 11.

Controller 21 receives image data representing Entrance Image S1 from Camera 24 at predetermined time intervals (e.g., 1 second), recognizes objects in Entrance Image S1 represented by the acquired image data, and monitors changes over time in the contour of the recognized objects.

When Baggage J is in the state shown in FIG. 11, Controller 21 detects that Baggage J, as recognized from Entrance Image S1, has not moved from its position at the upstream end of Cover 26 for a period of time that exceeds a predetermined period of time. In that case, Controller 21 judges that there is an abnormality in the transport of Baggage J and instructs Display 25 to switch the image do be displayed from Entrance Image S1 without a warning message to Entrance Image S1 with a warning message. In other word, Inspection System 2 switches the image to be displayed based on a status of Baggage J placed on Conveyor 23 by Visitor P. As a result, if any problem occurs in transportation of Baggage J, Attendant Q can easily notice the problem.

Modified Example 6

Display 25 may change attributes, such as a size, position, shape, thickness of border, color, flicker, etc., of the area for displaying Entrance Image S1 or Inspection Image S depending on, for example, a probability that Baggage J contains a hazardous item or on a probability that a problem occurs in transportation of Baggage J.

For example, Inspection Device 22 evaluates a probability that an object recognized from Inspection Image S2 is a hazardous item as defined by three levels such as "high," "medium," and "low." Controller 21 instructs Display 25 to change the size and thickness of the boundary line, etc., of the area for displaying Inspection Image S2, depending on the evaluated hazard level. Similarly, Controller 21 evaluates a probability that Baggage J, which is continuously recognized from Entrance Image S1, has become stuck as defined by three levels such as "high," "medium," and "low." Controller 21 instructs Display 25 to change the size and thickness of the boundary line, etc., of the area for displaying Entrance Image S1, depending on the evaluated level.

In this regard, if a probability that Baggage J contains a hazardous item and a probability that Baggage J will become stuck are the same (e.g., both are "low"), Controller 21 instructs Display 25 to display Entrance Image S1 and Inspection Image S2 in each of two areas in the same size, as shown in FIG. 9. In this case, Attendant Q pays equal attention to both Entrance Image S1 and Inspection Image S2.

On the other hand, for example, if the probability that the baggage contains a hazardous item and the probability that the baggage will become stuck differ from one another, Controller 21 instructs Display 25 to display Entrance Image S1 and Inspection Image S2 in each of two areas in different sizes.

For example, if the probability that the baggage contains hazardous items is "high" and the probability that the baggage will become stuck is "low," Controller 21 instructs Display 25 to display Inspection Image S2 in a larger area than Entrance Image S1. In this case, Attendant Q will pay more attention to Inspection Image S2 than to Entrance Image S1.

Modified Example 7

In the embodiment described above, Inspection System 2 is equipped with Cover 26 covering a predetermined area from the entrance of Inspection Device 22 to the upstream in the transport direction and Cover 27 covering a predetermined area from the exit of Inspection Device 22 to the downstream in the transport direction. Inspection System 2 may be equipped with only one of these covers.

Modified Example 8

In the embodiments described above, Cover 26 and Cover 27 are made of a transparent material and the inside is visible in its entirety from the outside. At least one of Cover 26 and Cover 27 may have a non-transparent portion.

Figure 12:
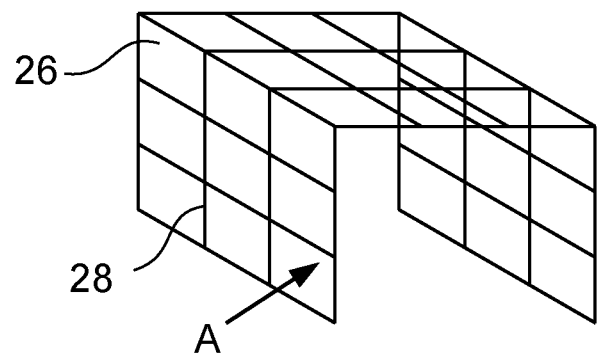
FIG. 12 shows an example of a cover of an inspection system according to a modified example of the second embodiment, with objects inside the cover being visible from outside of the cover.

FIG. 12 shows an example of Cover 26 that is partially non-transparent. Cover 26 shown in FIG. 12 consists of plural Wires 28 arranged in a grid pattern. Since Wires 28 are not transparent, some parts of the inside of Cover 26 cannot be seen from the outside of Cover 26, and are hidden by Wires 28, However, most of the inside of Cover 26 can be seen from the outside of Cover 26 through Areas A between Wires 28 where there is no object. In such a case, Camera 24 may capture images of the inside of the cover, and Controller 21 may control Display 25 to display the images.

Modified Example 9

Figure 13:
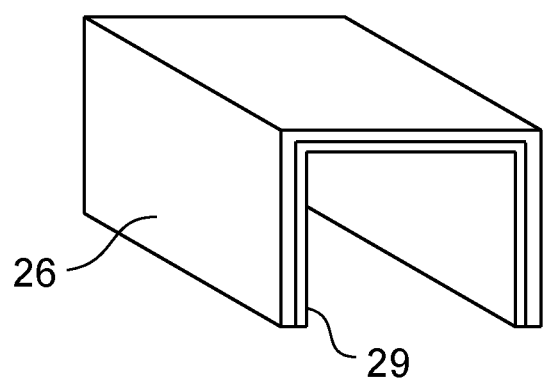
FIG. 13 shows an example of a cover of an inspection system according to a modified example of the second embodiment, that has an inner cover member.

The inner surface of at least one of Cover 26 and Cover 27 may be covered with a material that generates less friction than the inner surface. FIG. 13 shows an example of Cover 26, the inner surface of which is covered with Inner Cover Member 29. Inner Cover Member 29 is made of a transparent material that has a lower coefficient of friction than the material of Cover 26. Inner Cover Member 29 covers the area where baggage transported by Conveyor 23 may come into contact.

For example, if Cover 26 is made of a material such as glass, acrylic resin, polycarbonate resin, etc., when baggage made of a material such as leather, vinyl, etc., is transported inside Cover 26, the baggage may not easily slide against Cover 26 and may become stuck inside Cover 26.

Since Inner Cover Member 29 is formed of a material that has a lower coefficient of friction than the material of Cover 26, when the baggage comes in contact with Inner Cover Member 29, the baggage is less likely to become stuck inside Cover 26 than if the inside of Cover 26 is not covered with Inner Cover Member 29.

Modified Example 10

A program executed by Controller 21 of Inspection System 2 can be provided as stored in a recording medium readable by a computer, such as magnetic tape, a magnetic disk or other magnetic recording medium, an optical disk or other optical recording medium, an optical magnetic recording medium, semiconductor memory, etc. The program may be downloaded to a computer via the Internet or other communication network and executed by the computer. In the embodiment described above, a controller exemplified by Controller 21 is not limited to a CPU. For example, a dedicated processor may be used as the controller in the present invention.

Third Exemplary Embodiment

Figure 14A:
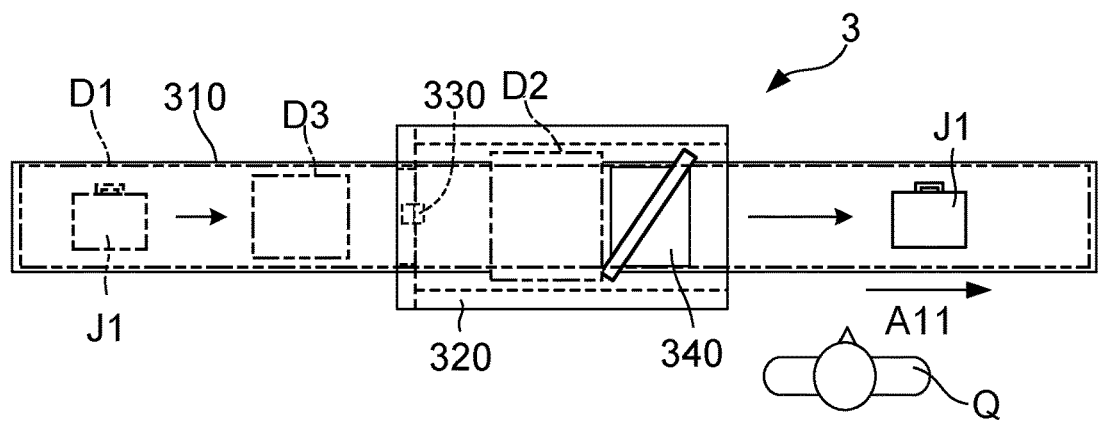
FIG. 14A is a top view of an inspection system according to a third embodiment of the present invention.
Figure 14B:
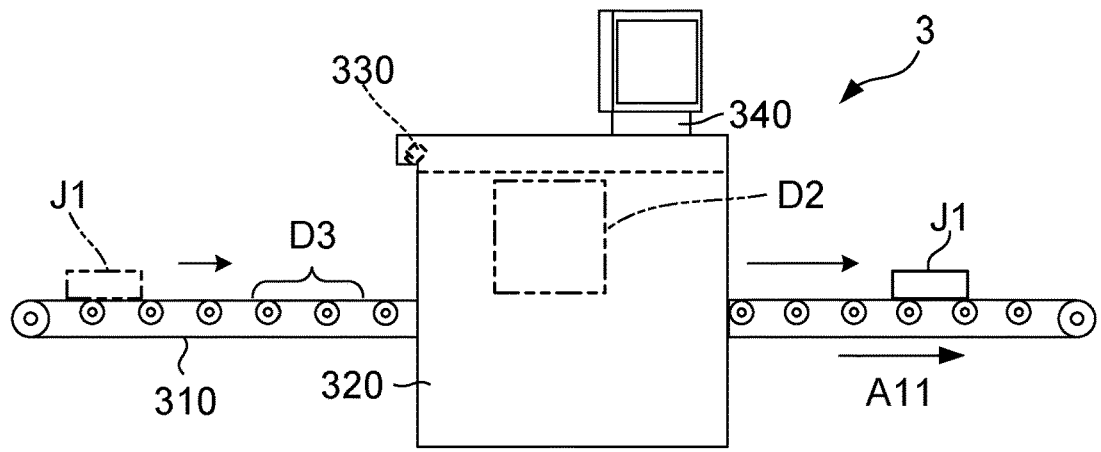
FIG. 14B is a side view of the inspection system according to the third embodiment of the present invention.

FIGS. 14A and 14B (hereinafter collectively referred to as FIG. 14) show the appearance of Inspection System 3 according to the third exemplary embodiment of the present invention. FIG. 14A is a top view of Inspection System 3 and FIG. 14B is a side view of Inspection System 3.

Inspection System 3 is a system that inspects whether visitors are carrying hazardous items such as knives, etc., at an entrance to a public space such as an event venue, etc. Inspection System 3 inspects, for example, Baggage J1 shown in FIG. 14. Inspection System 3 is used by Attendant Q who performs several tasks related to the inspection.

Inspection System 3 is equipped with Conveyor 310, Inspection Device 320, Camera 330 and Controller 340. Conveyor 310 is a belt conveyor that forms Transport Path D1 and transports Baggage J1 through Transport Path D1 in Transport Direction A11. Attendant Q stands by the left or right side of Transport Path D1, and an inspection lane where visitors pass through is located on the opposite side of Transport Path D1 from Attendant Q.

Inspection Device 320 is a device that takes transmitted-light images of baggage by use of electromagnetic waves that transmit through the baggage. Inspection Device 320 irradiates electromagnetic waves to Baggage J1 moving through Transmitted-light Image Shooting Area D2 in the device, and generates an image of Baggage J1 as a transmitted-light image, which is depicted by shading according to an intensity of the electromagnetic waves transmitted through Baggage J1. The electromagnetic waves that Inspection Device 320 irradiates to Baggage J1 are electromagnetic waves in a frequency band that penetrate Baggage J1 but have different transmission rates depending on a material of the contents of Baggage J1, such as X-rays.

Camera 330 is located above the entrance end of Inspection Device 320. Camera 330 has an image sensor that detects visible light and captures objects represented by visible light. Camera 330 is located so that its shooting range covers Visible-light Image Shooting Area D3 in Transport Path D1 upstream from Transmitted-light Image Shooting Area D2. Camera 330 repeatedly takes visible-light images showing an appearance of Baggage J1 by use of visible light while Baggage J1 is transported by Conveyor 310 and moves through Visible-Light Image Shooting Area D3. Visible-light Image Shooting Area D3 is an example of a "predetermined area" in the present invention.

Controller 340 is a device that controls operations of each device equipped with Inspection System 3. Controller 340 is a computer equipped with a processor such as a Central Processing Unit (CPU), memory, storage, a communication unit, etc. Controller 340 is electrically connected to Conveyor 310, Inspection Device 320, and Camera 330 by signal lines. Controller 340 controls operations of these devices while exchanging data with these devices.

Controller 340 is also connected to a display and displays images. Controller 340 reads a program from its storage to its memory, performs various data processing by its processor according to the program, communicates using its communication unit, reads data from its storage to its memory, writes data from its memory to its storage, etc., so that Controller 340 realizes functions as shown in FIG. 15.

Figure 15:
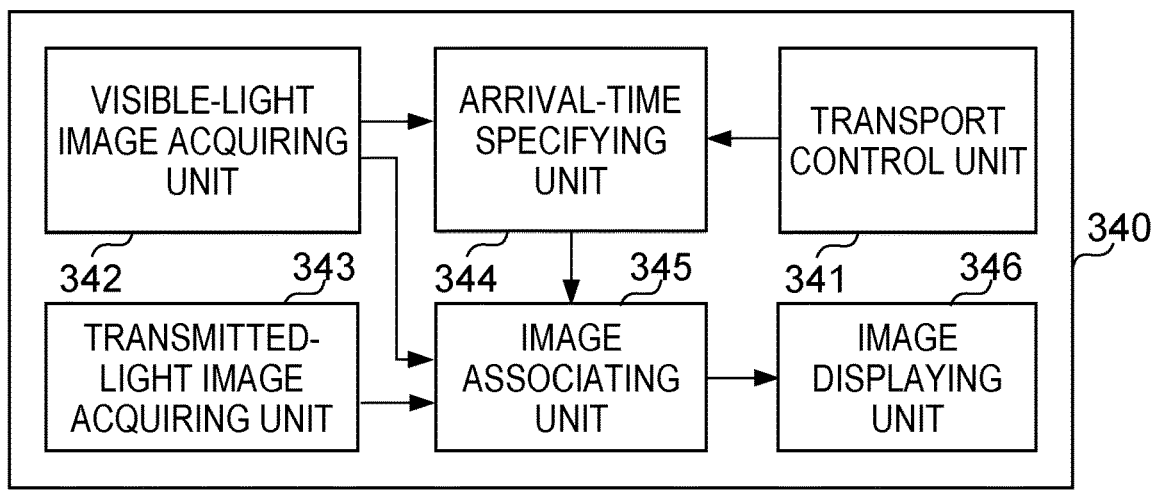
FIG. 15 shows a functional configuration of the inspection system according to the third embodiment.

FIG. 15 shows a functional configuration realized by Controller 340. Controller 340 realizes, as functional components, Transport Control Unit 341, Visible-light Image Acquiring Unit 342, Transmitted-light Image Acquiring Unit 343, Arrival-time Specifying Unit 344, Image Associating Unit 345 and Image Displaying Unit 346. Transport Control Unit 341 controls transport of Baggage J1 by Conveyor 310. Transport Control Unit 341, for example, starts and stops transport of Baggage J1 based on operations of Attendant Q.

Transport Control Unit 341 rotates the belt of Conveyor 310 to achieve a transport speed that is predetermined or set by Attendant Q while Conveyor 310 is operating. Transport Control Unit 341 informs Arrival-time Specifying Unit 344 of the transport speed. Visible-light Image Acquiring Unit 342 controls Camera 330 to repeatedly shoot Visible-light Image Shooting Area D3, and acquires visible-light images of Baggage J1 moving through Visible-light Image Shooting Area D3. Visible-light Image Acquiring Unit 342 provides the acquired visible-light images to Arrival-time Specifying Unit 344.

Transmitted-light Image Acquiring Unit 343 controls Inspection Device 320 to repeatedly capture Transmitted-light Image Shooting Area D2, and acquires transmitted-light images of Baggage J1 moving through Transmitted-light Image Shooting Area D2. Transmitted-light Image Acquiring Unit 343 provides the acquired transmitted-light images to Arrival-time Specifying Unit 344. Arrival-time Specifying Unit 344 specifies a time when Baggage J1 arrives at Visible-light Image Shooting Area D3 (hereinafter referred to as "second arrival time") based on a time when Baggage J1 arrives at Transmitted-light Image Shooting Area D2 (hereinafter referred to as "first arrival time").

More specifically, Arrival-time Specifying Unit 344 specifies a time when a central area of Baggage J1 arrives at a predetermined reference position in Transmitted-light Image Shooting Area D2 as the first arrival time. Then, Arrival-time Specifying Unit 344 calculates the second arrival time based on the specified first arrival time.

Figure 16A:
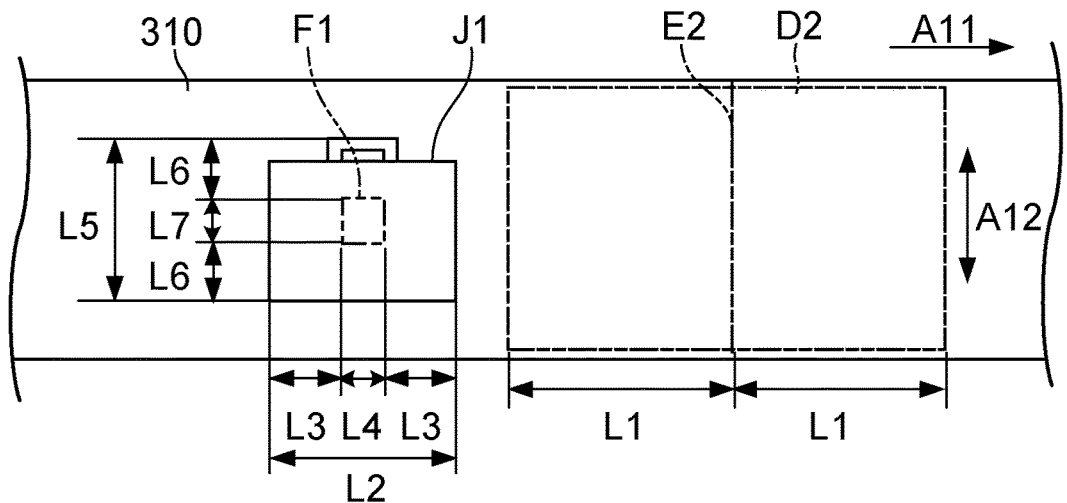
FIG. 16A shows an example of a reference position and a central region in the inspection system according to the third embodiment.
Figure 16B:
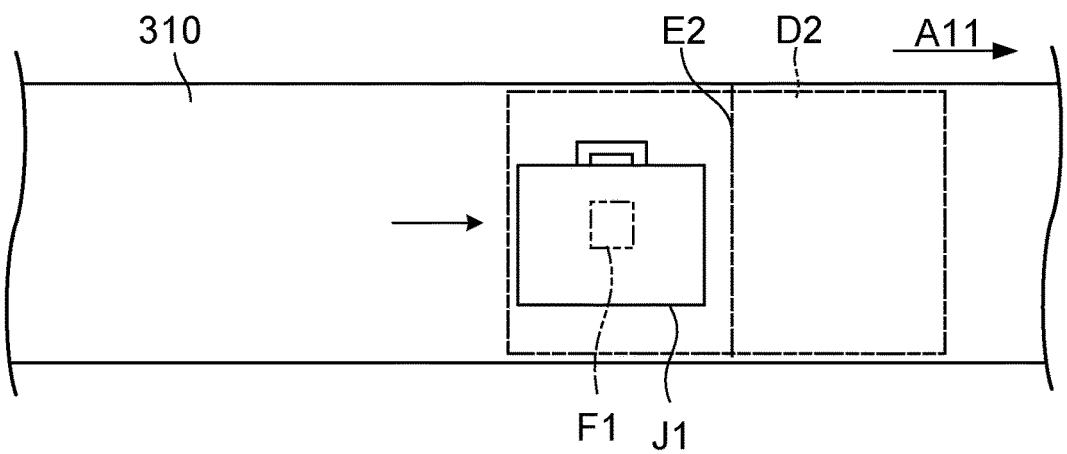
FIG. 16B shows an example of a reference position and a central region in the inspection system according to the third embodiment.
Figure 16C:
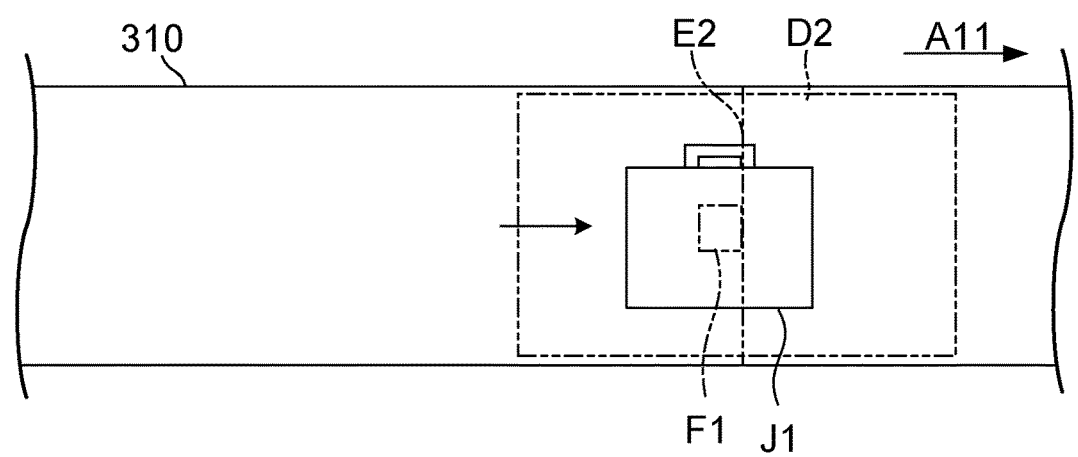
FIG. 16C shows an example of a reference position and a central region in the inspection system according to the third embodiment.

FIGS. 16A to 16C (hereafter these figures are collectively referred to as FIG. 16) show an example of the reference position and a central area of Baggage J1. In FIG. 16, Reference Position E2 of Transmitted-light Image Shooting Area D2 and Central Area F1 of Baggage J1 are shown by two dotted lines. In FIG. 16, Inspection Device 320 and Camera 330 are omitted to simplify the figure.

In the example shown in FIG. 16, Reference Position E2 is the center position in Transport Direction A11 of Transmitted-Light Image Shooting Area D2. Namely, a distance from the upstream edge of Transmitted-light Image Shooting Area D2 to Reference Position E2 and a distance from Reference Position E2 to the downstream edge of Transmitted-light Image Shooting Area D2 are equal, and they are both L1. In the example shown in FIG. 16, Central Area F1 is a rectangular area including the center of Baggage J1. More specifically, Central Area F1 is defined so that a distance between the upstream end of Baggage J1 and an upstream end of Central Area F1 is L3, a distance between the downstream end of Baggage J1 and a downstream end of Central Area F1 is L3, a distance between the right end of Baggage J1 and a right end of Central Area F1 is L6, and a distance between the left end of Baggage J1 and a left end of Central Area F1 is L6.

Distance L3 is defined, for example, as a predetermined percentage of Length L2 of Baggage J1 in Transport Direction A11. For example, if the predetermined percentage is 40%, Distance L3 is Length L2 multiplied by 0.4, and Length L4 of Central Area F1 in Transport Direction A11 is Length L2 multiplied by 0.2.

Distance L6 is defined, for example, as a predetermined percentage of Length L5 of Baggage J1 in Widthwise Direction A12. For example, if the predetermined percentage is 40%, Distance L6 is Length L5 multiplied by 0.4, and Length L7 of Central Area F1 in Widthwise Direction A12 is Length L5 multiplied by 0.2. Arrival-time Specifying Unit 344 recognizes an object to be transported (Baggage J1 in the example of FIG. 16) from transmitted-light images repeatedly supplied from Transmitted-light Image Acquiring Unit 343 using known image recognition techniques.

In the condition shown in FIG. 16A, Baggage J1 is not yet recognized because Baggage J1 has not yet reached Transmitted-Light Image Shooting Area D2. In the condition shown in FIG. 16B, Arrival-time Specifying Unit 344 recognizes Baggage J1 from transmitted-light images because the entire Baggage J1 is included in Transmitted-light Image Shooting Area D2. Arrival-time Specifying Unit 344 specifies coordinates of the recognized front and rear ends of Baggage J1 in Transport Direction A11 and the left and right ends of Baggage J1 in Widthwise Direction A12, in a predetermined coordinate system such as a two-dimensional coordinate system whose origin is the upper left corner of the transmitted-light images.

Arrival-time Specifying Unit 344 calculates coordinates of the four vertices of Central Area F1 based on the specified coordinates of the four ends of Baggage J1 in accordance with the conditions described above. Arrival-time Specifying Unit 344 calculates the coordinates of Central Area F1 each time a transmitted-light image is supplied. Arrival-time Specifying Unit 344 identifies a time when the coordinates of the front end of Central Area F1 reach Reference Position E2, as shown in FIG. 16C, as the first arrival time.

Information on locations of Transmitted-light Image Shooting Area D2 and Visible-light Image Shooting Area D3 is stored in advance, and Arrival-time Specifying Unit 344 uses the information to identify the first arrival time.

Figure 17:
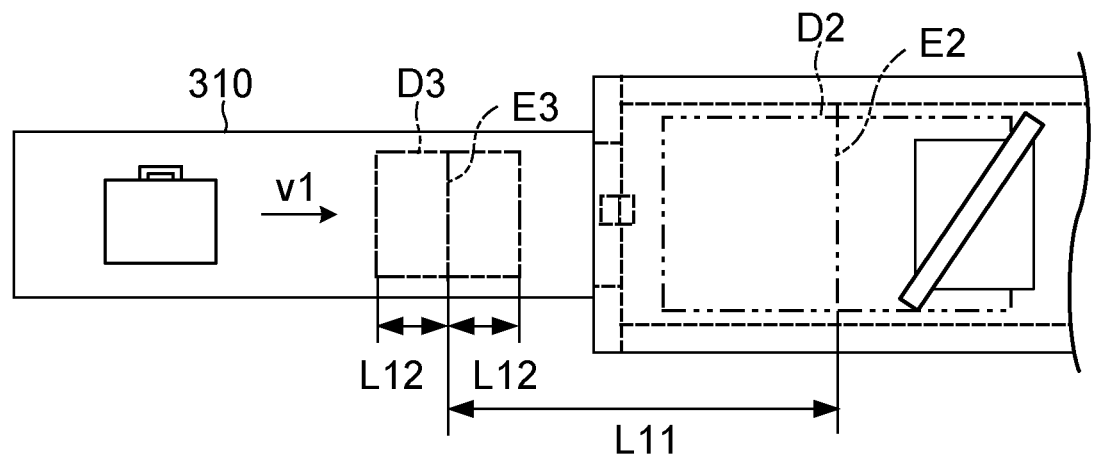
FIG. 17 shows an example of a transmitted-light image shooting area and a visible-light image shooting area in the inspection system according to the third embodiment.

FIG. 17 shows the locations of Transmitted-light Image Shooting Area D2 and Visible-light Image Shooting Area D3. The information on the locations of Transmitted-light Image Shooting Area D2 and Visible-light Image Shooting Area D3 includes Distance L11 between Reference Position E3 of Visible-light Image Shooting Area D3 and Reference Position E2 of Transmitted-light Image Shooting Area D2.

Reference Position E3 is the center position of Visible-Light Image Shooting Area D3 in Transport Direction A11. Namely, a distance from the downstream edge of Visible-light Image Shooting Area D3 to Reference Position E3 and a distance from Reference Position E3 to the upstream edge of Visible-light Image Shooting Area D3 are equal, and they are both L12. Arrival-time Specifying Unit 344 calculates a transport time, which is a time required to transport Baggage J1 from Reference Position E3 to Reference Position E2, by dividing Distance L11 by Transport Speed V1. Transport Speed V1 is notified to Arrival-time Specifying Unit 344 by Transport Control Unit 341.

Arrival-time Specifying Unit 344 identifies the time before the first arrival time by the transport time as the second arrival time. Arrival-time Specifying Unit 344 notifies Image Associating Unit 345 of the first arrival time and the second arrival time. Image Associating Unit 345 associates a visible-light image taken by Camera 330 with a transmitted-light image taken by Inspection Device 320 based on the first arrival time and the second arrival time.

More specifically, Image Associating Unit 345 associates a visible-light image taken by Camera 330 at the second arrival time with a transmitted-light image taken by Inspection Device 320 at the first arrival time. Image Associating Unit 345 provides Image Displaying Unit 346 with the associated visible-light image and transmitted-light image. Image Displaying Unit 346 displays both the visible-light image and the transmitted-light image.

Figure 18:
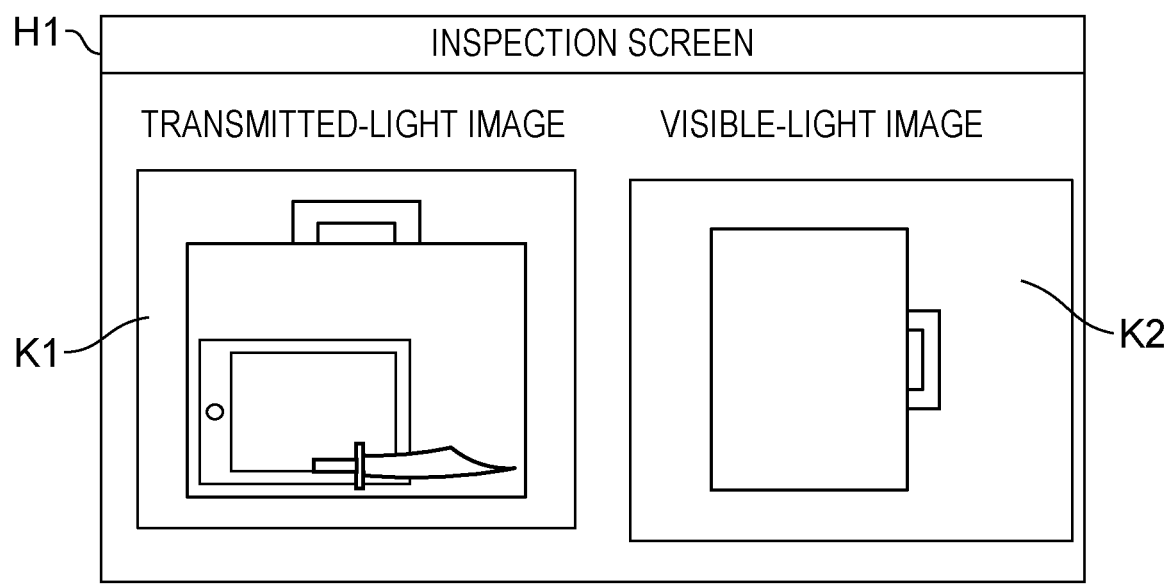
FIG. 18 shows an example of a screen showing a visible-light image and a transmitted-light image displayed by the inspection system according to the third embodiment.

FIG. 18 shows an example of Inspection Screen H1, which is a screen displayed by Image Displaying Unit 345. Inspection Screen H1 shown in FIG. 18 displays Transmitted-light Image K1 and Visible-light Image K2 side by side. Attendant Q looks at the displayed transmitted-light image to determine whether baggage of a visitor contains any hazardous item. In the example shown in FIG. 18, the baggage includes a knife, which is a hazardous item. Attendant Q looks at the displayed visible-light image and identifies Baggage J1 coming out of Inspection Device 320 as the baggage containing the hazardous item. Then, Attendant Q picks up the identified Baggage J1 from Transport Path D1 and checks the contents of Baggage J1.

Figure 19:
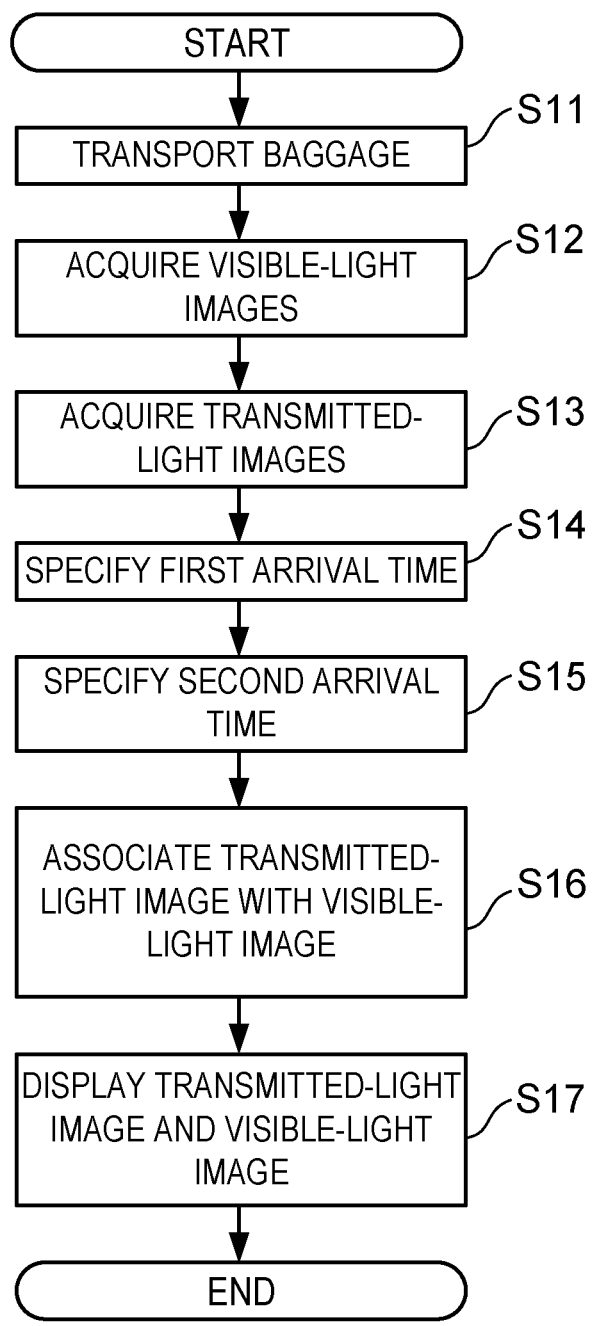
FIG. 19 shows an example of a flow of processing performed by a controller of the inspection system according to the third embodiment.

As described above, Controller 340 performs processes for associating a transmitted-light image with a visible-light image. FIG. 19 shows an example of a flow of processing for the image association. First, Transport Control Unit 341 controls Conveyor 310 to transport Baggage J1 (Step S11). Next, Visible-light Image Acquiring Unit 342 acquires visible-light images from Camera 330 while Baggage J1 is transported in Visible-light Image Shooting Area D3 (Step S12).

Next, Transmitted-light Image Acquiring Unit 343 acquires transmitted-light images from Inspection Device 320 while Baggage J1 is transported in Transmitted-light Image Shooting Area D2 (Step S13). Next, Arrival-Time Specifying Unit 344 specifies a time when Baggage J1 arrives at Transmitted-Light Image Shooting Area D2 as the first arrival time (Step S14). Next, Arrival-time Specifying Unit 344 specifies a time when Baggage J1 arrives at Visible-light Image Shooting Area D3 as the second arrival time (Step S15).

Subsequently, Image Associating Unit 345 associates a visible-light image of Baggage J1 taken by Camera 330 at the second arrival time specified at Step S15 with a transmitted-light image of Baggage J1 taken by Inspection Device 320 at the first arrival time specified at Step S14

(Step S16). Then, Image Displaying Unit 346 displays both the visible-light image and the transmitted-light image that were associated with each other at Step S16 (Step S17).

As a method of associating a visible-light image with a transmitted-light image, for example, a method using a first sensor that detects baggage when it reaches Visible-light Image Shooting Area D3 and a second sensor that detects baggage when it reaches Transmitted-light Image Shooting Area D2 can be used. According to this method, a visible-light image taken by Camera 330 when the first sensor detects baggage and a transmitted-light image taken by Inspection Device 320 when the second sensor detects baggage are associated with each other. However, since shapes and sizes of baggage to be inspected are not constant, a timing when the first sensor detects the luggage may not be the best timing for Camera 330 to shoot the baggage, and a timing when the second sensor detects the baggage may not be the best timing for Inspection Device 320 to shoot the baggage. As a result, an undesirable visible-light image and transmitted-light image may be associated with each other.

According to this embodiment, based on the first arrival time when Baggage J1 arrived at Reference Position E2 of Transmitted-light Image Shooting Area D2, the second arrival time when Baggage J1 arrived at Reference Position E3 of Visible-light Image Shooting Area D3 is specified. Since the transport speed of Baggage J1 and the distance from Reference Position E3 to Reference Position E2 are known, the second arrival time can be accurately specified based on the first arrival time. As a result, according to this embodiment, regardless of a shape and size of Baggage J1, the transmitted-light image and the visible-light image taken at the appropriate timings are associated with each other and displayed.

Furthermore, according to this embodiment, the time when Central Area F1 of Baggage J1 arrived at Reference Position E2 is identified as the first arrival time, and the time when Central Area F1 of Baggage J1 arrived at Reference Position E3 is identified as the second arrival time. Thus, according to this embodiment, since the first arrival time and second arrival time are specified based on the position of Central Area F1 rather than the position of the front end of Baggage J1, even if Baggage J1 has a long shoulder strap and Baggage J1 is placed on Conveyor 310 with the shoulder strap extending in Transport Direction A11, it is unlikely that a visible-light image and a transmitted-light image that fail to show the entire main body of Baggage J1 will be associated with each other and displayed.

Fourth Exemplary Embodiment

A fourth exemplary embodiment of the present invention is now described below. The fourth embodiment shares many points with the third embodiment. Therefore, in the following description only those points in which the fourth embodiment differs from the third embodiment are described. In the third embodiment, a time when Baggage J1 reaches Visible-light Image Shooting Area D3, i.e. a second arrival time, is specified based on a time when Baggage J1 reaches Transmitted-light Image Shooting Area D2, i.e. a first arrival time. In contrast, in the fourth example, a time when Baggage J1 reaches Transmitted-light Image Shooting Area D2 is specified based on a time when Baggage J1 reaches Visible-light Image Shooting Area D3.

In this embodiment, a time when Baggage J1 reaches Visible-light Image Shooting Area D3 is referred to as a third arrival time, and a time when Baggage J1 reaches Transmitted-light Image Shooting Area D2 is referred to as a fourth arrival time. That is, in this embodiment, Arrival-time Specifying Unit 344 specifies the fourth arrival time based on the third arrival time.

More specifically, when Arrival-time Specifying Unit 344 recognizes Baggage J1 from the central region of a visible-light image provided from Camera 330, Arrival-time Specifying Unit 344 specifies a time when the visible-light image was taken by Camera 330 as a third arrival time.

Figure 20A:
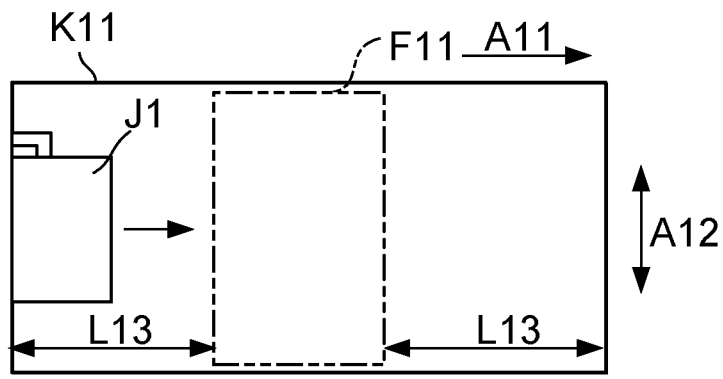
FIG. 20A shows an example of a visible-light image taken by the inspection system according to the fourth embodiment.
Figure 20B:
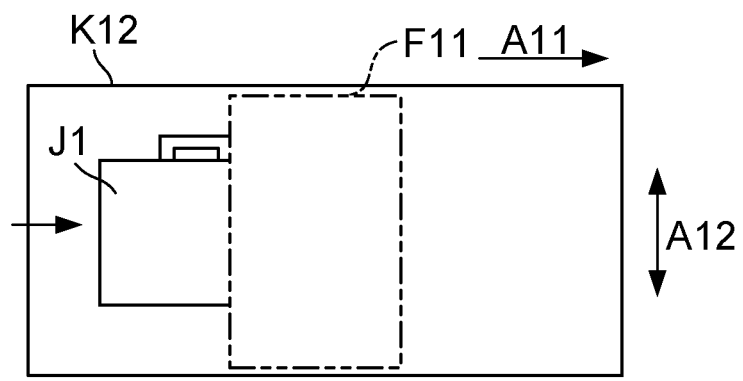
FIG. 20B shows an example of a visible-light image taken by the inspection system according to the fourth embodiment.
Figure 20C:
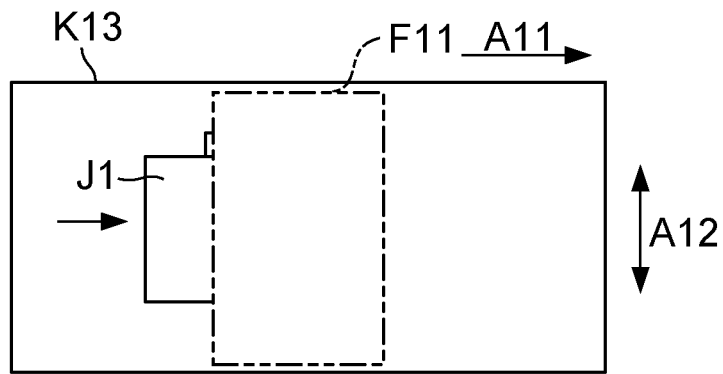
FIG. 20C shows an example of a visible-light image taken by the inspection system according to the fourth embodiment.

FIGS. 20A to 20C (hereafter these figures are collectively referred to as FIG. 20) show examples of visible-light images taken by Camera 330. Visible-light Image Acquiring Unit 342 repeatedly acquires visible-light images of Baggage J1 from Camera 330 at predetermined time intervals. Visible-light Images K11, K12 and K13 shown in FIGS. 20A, 20B and 20C respectively are selected from a series of visible-light images, and these images show Baggage J1 moving in Transport Direction A11. FIGS. 20A, 20B and 20C are hereinafter collectively referred to as Visible-light Image K10.

Central Area F11 shown in FIG. 20 is an area of Visible-light Image K10 that is centered in Transport Direction A11. Central Area F11 is separated from the front and rear ends of Visible-light Image K10 in Transport Direction A11 by Distance L13. A length of Central Area F11 in Widthwise Direction A12 is substantially equal to the length of Visible-light Image K10 in Widthwise Direction A12. FIG. 20A shows that Baggage J1 has not yet reached Central Area F11.

FIG. 20B shows that one-third of the entire Baggage J1 in Transport Direction A11 is in Central Area F11. FIG. 20C shows two-thirds of the entire Baggage J1 in Transport Direction A11 is in Central Area F11. Arrival-time Specifying Unit 344 determines that Baggage J1 is recognized from Central Area F11 when, for example, a predetermined ratio of Baggage J1 in Transport Direction A11 is in Central Area F11. Following is a description of a case where the predetermined rate is two-thirds.

Arrival-time Specifying Unit 344 specifies a time when Camera 330 took Visible-light Image K13 as the third arrival time. Arrival-time Specifying Unit 344 may consider a time when Arrival-time Specifying Unit 344 receives Visible-light Image K13 from Camera 330 as the time when Camera 330 took Visible-light Image K13. Arrival-time Specifying Unit 344 specifies a time before the third arrival time by the transport time, i.e. the time required for Baggage J1 to be transported from Reference Position E3 in Visible-light Image Shooting Area D3 to Reference Position E2 in Transmitted-light Image Shooting Area D2, as the fourth arrival time.

Arrival-time Specifying Unit 344 notifies Image Associating Unit 345 of the third arrival time and fourth arrival time. Image Associating Unit 345 specifies a visible-light image taken by Camera 330 at the third arrival time, and a transmitted-light image taken by Inspection Device 320 at the fourth arrival time.

Then, Image Associating Unit 345 associates the specified visible-light image and the specified transmitted-light image.

Since the transport speed of Baggage J1 and the distance from Reference Position E3 to Reference Position E2 are known, the fourth arrival time can be accurately specified based on the third arrival time. Therefore, according to this embodiment, as in the third embodiment, regardless of a size or shape of Baggage J1, a visible-light image and a transmitted-light image taken at appropriate timings are specified, and these images are associated with each other.

In this embodiment, a time when a visible-light image from whose Central Area F11 Baggage J1 is recognized was taken by Camera 330 is specified as the third arrival time. Therefore, according to this embodiment, it is unlikely that a visible-light image that fails to show the entire main body of Baggage J1 will be specified to be associated with the transmitted-light image.

Modified Examples of Third Exemplary Embodiment and Fourth Exemplary Embodiment The third and fourth embodiments described above are exemplary implementations of the present invention, and they may be modified in various ways. The following are modified examples of the third and fourth embodiments. Two or more of the following modified examples may be combined as needed.

Modified Example 1

In the third embodiment described above, Central Area F1 of Baggage J1 is defined as an area where a distance from the upstream end of Baggage J1 to an upstream end of Central Area F1 and a distance from the downstream end of Baggage J1 to a downstream end of Central Area F1 are the same L3, as shown in FIG. 16A. A definition of Central Area F1 of Baggage J1 is not limited to the foregoing. For example, a distance from the upstream end of Baggage J1 to an upstream end of Central Area F1 and a distance from the downstream end of Baggage J1 to a downstream end of Central Area F1 may differ from each other.

Figure 21A:
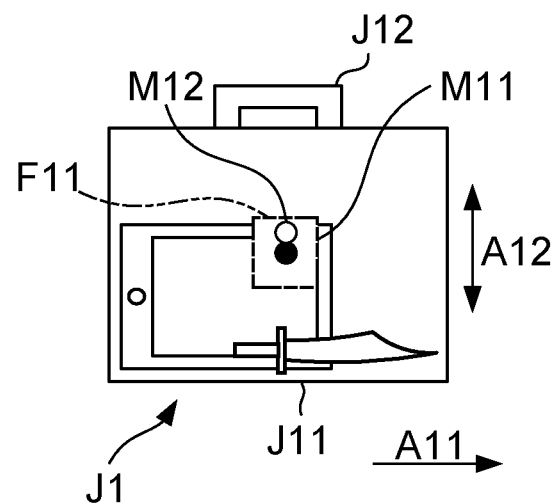
FIG. 21A shows an example of a central area in an inspection system according to a modified example of the third embodiment.

Methods for defining a central area of Baggage J1 are not limited to methods based on distances from ends of Baggage J1. For example, a central area of Baggage J1 may be defined based on locations of pixels comprising an image of Baggage J1 recognized from a visible-light image or a transmitted-light image. For example, in a transmitted-light image, an area of a predetermined size and shape, a center of which is positioned at the center of gravity of pixels representing Baggage J1, may be defined as its central area. The center of gravity of pixels is a point whose coordinates are an average of x-coordinates and an average of y-coordinates of the pixels. FIGS. 21A and 21A show examples of central area of baggage in this modified example. In FIG. 21A, M11 is the center of gravity of pixels representing Baggage J1, and F11 is the central area of Baggage J1.

Figure 21B:
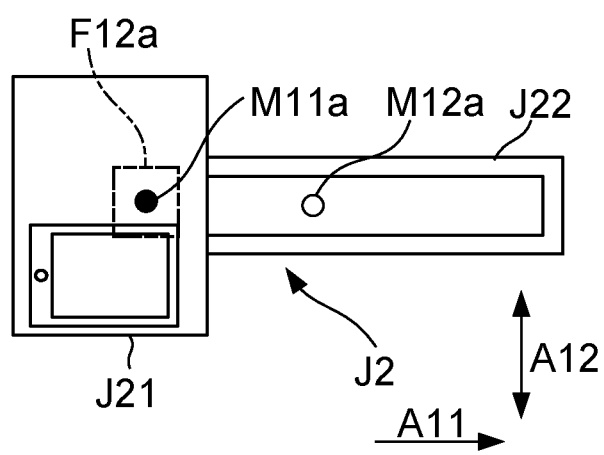
FIG. 21B shows an example of a central area in an inspection system according to the modified example of the third embodiment.

Baggage J1 shown in FIG. 21A has Main Body J11 and Handle J12. Since Handle J12 is short, a distance between a center of gravity of an image of Baggage J1 represented by M11 and a center point of the image of Baggage J1 represented by M12 is short. The center point of the image of Baggage J1 is defined as a point whose distance from an upstream end of Baggage J1 and from a downstream end of Baggage J1 are equal and whose distance from a light end of Baggage J1 and from a left end of Baggage J1 are equal. In FIG. 21B, a center of gravity of an image of Baggage J2 is represented by M11a, and a center point of the image of Baggage J2 is represented by M12a. Baggage J2 shown in FIG. 21B has Main Body J21 and Handle J22.

Since Handle J22 is long, a distance between a center of gravity of an image of Baggage J2 represented by M11a and a center point of the image of Baggage J2 represented by M12a is long. Moreover, a longitudinal direction of Handle J22 is along Transport Direction A11. If a center point of an image of baggage and a center of gravity of the image of the baggage are significantly displaced in Transport Direction A11, as shown in FIG. 21B, a transmitted-light image selected to be used for specifying a first arrival time based on the location of the center point, and a transmitted-light image selected to be used for specifying a first arrival time based on the location of the center of gravity, are significantly different.

Figure 22A:
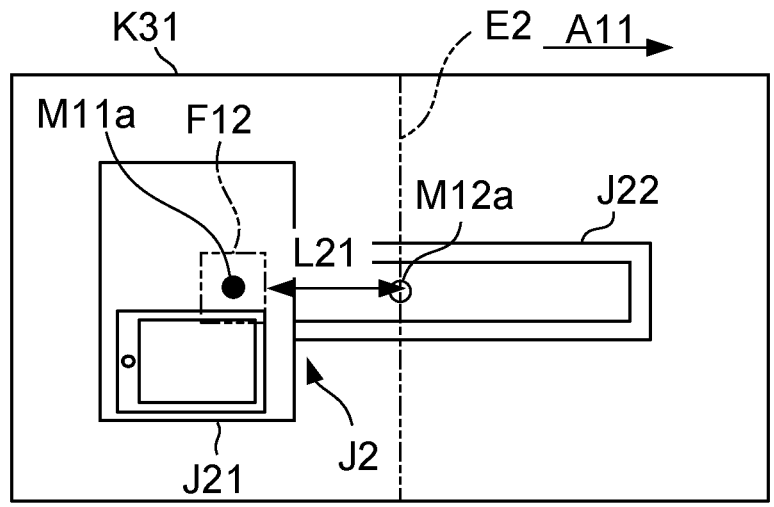
FIG. 22A shows an example of a transmitted-light image taken by an inspection system according to the modified example of the third embodiment.

FIG. 22A shows a transmitted-light image selected to be used for specifying a first arrival time based on a location of a center point of an image of Baggage J2. In other words, Transmitted-light Image K31 shown in FIG. 22A is an image taken by Inspection Device 320 when a center point of an image of Baggage J2 represented by M12a reaches Reference Position E2 of Transmitted-light Image Shooting Area D2. In this case, the entire Baggage J2 is included in Transmitted-light Image K31, but the image of Main Body J21, which contains items to be inspected, is located in a peripheral portion of Transmitted-light Image K31.

Figure 22B:
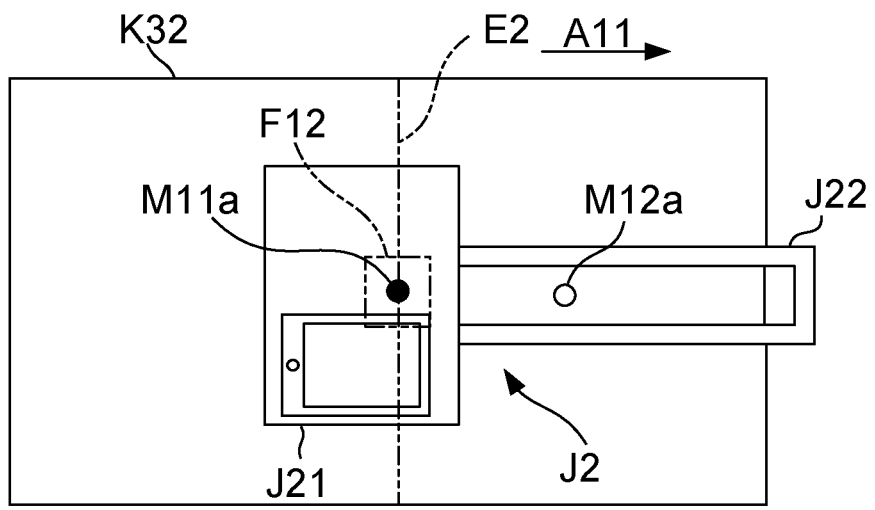
FIG. 22B shows an example of a transmitted-light image taken by an inspection system according to the modified example of the third embodiment.

FIG. 22B shows a transmitted-light image selected to be used for specifying a first arrival time based on a location of a center of gravity of an image of Baggage J2. In other words, Transmitted-light Image K32 shown in FIG. 22B is an image taken by Inspection Device 320 when a center of gravity of an image of Baggage J2 represented by M11a reaches Reference Position E2 of Transmitted-light Image Shooting Area D2. In this case, a part of Handle J22 is not included in Transmitted-light Image K32, but the image of Main Body J21, which contains items to be inspected, is located near the center of Transmitted-light Image K31.

Normally, a handle of baggage does not contain any hazardous items. However, if a malevolent visitor is aware that a part of a handle of baggage may not be inspected, the visitor may conceal a hazardous item in the handle of baggage. Therefore, to prevent any failure to recognize a hazardous item, a transmitted-light image to be used for specifying a first arrival time should be selected based on a center point of an image of baggage, as shown in FIG. 22A. In a case that in a visible-light image taken by Camera 330 at the second arrival time, Main Body J21 of Baggage J2 is located in a peripheral portion of the image as in the transmitted-light image, a problem will not arise if a shooting range of Camera 330 is as wide as that of Inspection Device 310. However, when a shooting range of Camera 330 is smaller than that of Inspection Device 320, Main Body J21 of Baggage J2 may not appear in a visible-light image selected based on the second arrival time.

Since Attendant Q identifies baggage primarily based on an appearance of a main body of baggage, a visible-light image displayed to Attendant Q should always show the entire main body of baggage. Therefore, a center point of an image of baggage may be used for selecting a transmitted-light image, and a center of gravity of an image of baggage may be used for selecting a visible-light image. In this case, Arrival-time Specifying Unit 344 specifies a transport time required for transporting Baggage J2 from a position where a center of gravity point (M11a) of an image of Baggage J2 is Reference Position E3 to a position where a center point of an image of Baggage J2 is Reference Position E2, based on a distance between a center of gravity of an image of Baggage J2 (M11a) and Reference Position E2 in the selected transmitted-light image such as Transmitted-light Image K31 shown in FIG. 22A. Then, Arrival-time Specifying Unit 344 specifies a second arrival time based on the transport time specified as above.

More specifically, Arrival-time Specifying Unit 344 specifies Distance L21 in Transport Direction A11 between a center point of an image of Baggage J2 (M12a) and a center of gravity of the image of Baggage J2 (M11a) in Transmitted-light Image K31 shown in FIG. 22A. Then, Arrival-time Specifying Unit 344 divides Distance L21 by the transport speed to calculate a time required to transport Baggage J2 by Distance L21. This calculated time is hereinafter referred to as a differential time. Arrival-time Specifying Unit 344 calculates a transport time required for Center Area F12 of Baggage J2 to move from Reference Position E3 to Reference Position E2, in the same way as in the third embodiment, and subtracts the differential time from the transport time to calculate an adjusted transport time.

Arrival-time Specifying Unit 344 specifies as a second arrival time a time before the first arrival time by the adjusted transport time. Then, Arrival-time Specifying Unit 344 specifies a visible-light image taken by Camera 330 at the second arrival time to be displayed together with Transmitted-light Image K31. As a result, Attendant Q can check whether Baggage J2 contains hazardous items by looking at the transmitted-light image that shows the entire Baggage J2, and can easily identify Baggage J2 by looking at the visible-light image that shows the entire Main Body J21 that is the essential part of Baggage J2.

Modified Example 2

To ensure that the entire baggage is included in each of a visible-light image and a transmitted-light image displayed by Inspection System 3, Inspection System 3 may be equipped with a mechanism that brings attached parts of baggage that extend well beyond a main body of the baggage, such as Handle J22 of Baggage J2, closer to the main body.

FIGS. 23A to 23D (these figures are collectively referred to as FIG. 23) show a partial view of Inspection System 3b according to this modified example. Baggage J3 shown in FIG. 23 has Main Body J31 and has Handle J32 that is attached to Main Body J31. Handle J32 is made of a flexible material.

Inspection System 3b is equipped with Mechanism 350 that brings Handle J32 closer to Main Body J31 of Baggage J3 in an area upstream from Visible-Light Image Shooting Area D3. Mechanism 350 has Pushing Member 351. Mechanism 350 is a rectangular plate-shaped member made of a flexible material such as rubber with plural slits of a predetermined length extending inward from one edge. The plural slits form Pushing Member 351 in Mechanism 350, which consists of plural strips arranged without gaps between them.

Figure 23A:
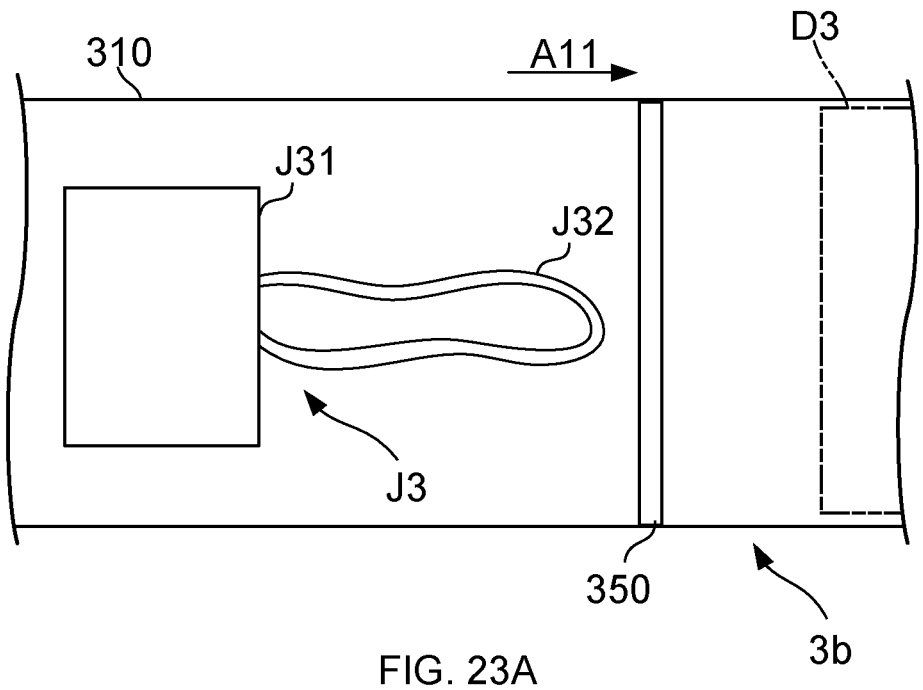
FIG. 23A shows an inspection system according to a modified example of the third embodiment.
Figure 23B:
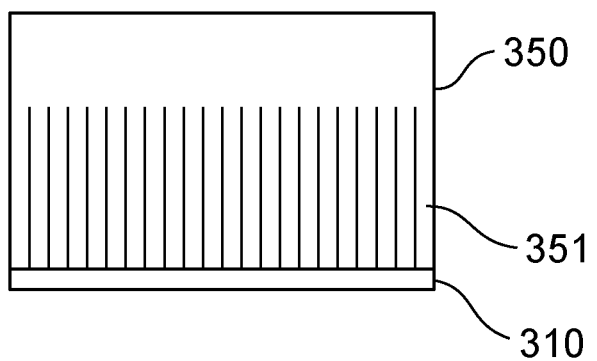
FIG. 23B shows the inspection system according to the modified example of the third embodiment.
Figure 23C:
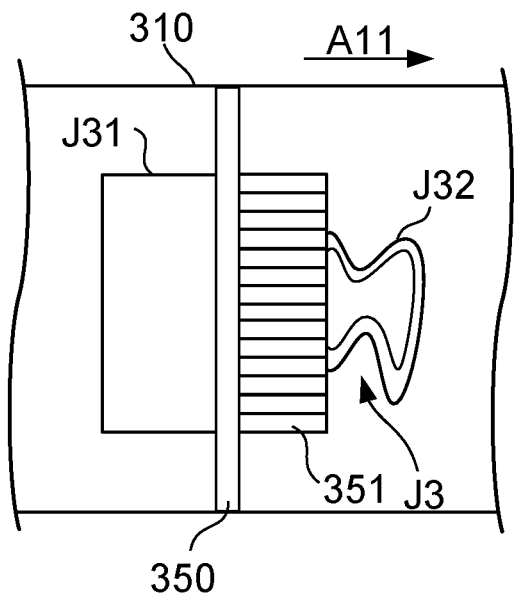
FIG. 23C shows the inspection system according to the modified example of the third embodiment.
Figure 23D:
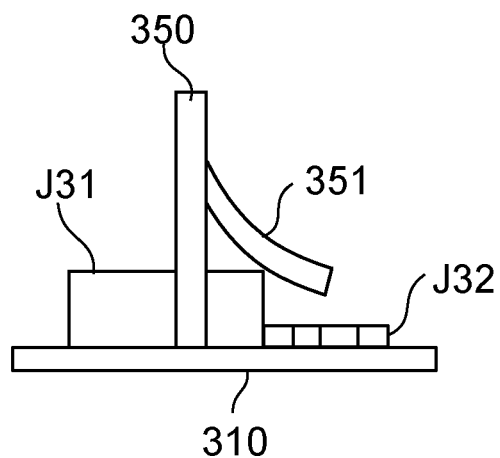
FIG. 23D shows the inspection system according to the modified example of the third embodiment.

As shown in FIG. 23A, Mechanism 350 is positioned at a height where its bottom edge, from which the plural slits extend inward, touches the top surface of the belt of Conveyor 310, blocking the transport path of the baggage. Since Pushing Member 351 is flexible, it bends in Transport Direction A11 and thus allows Baggage J3 to pass under Mechanism 350 when Baggage J3 is transported by Conveyor 310 as shown in FIG. 23C and FIG. 23D. When Baggage J3 passes under Mechanism 350, Pushing Member 351 pushes Handle J32 back in the opposite direction of Transport Direction A11 to bring Handle J32 closer to Main Body J31.

According to this modified example, Handle J32 becomes closer to Main Body J31 and a length of Baggage J3 in Transport Direction A11 becomes shorter. As a result, Baggage J3 in its entirety can be seen in both the transmitted-light image and the visible-light image displayed by Inspection System 3b, and Main Body J31 can be seen near the center of the images.

Modified Example 3

In the fourth embodiment, Inspection System 3 may be equipped with a sensor to detect objects.

Figure 24:
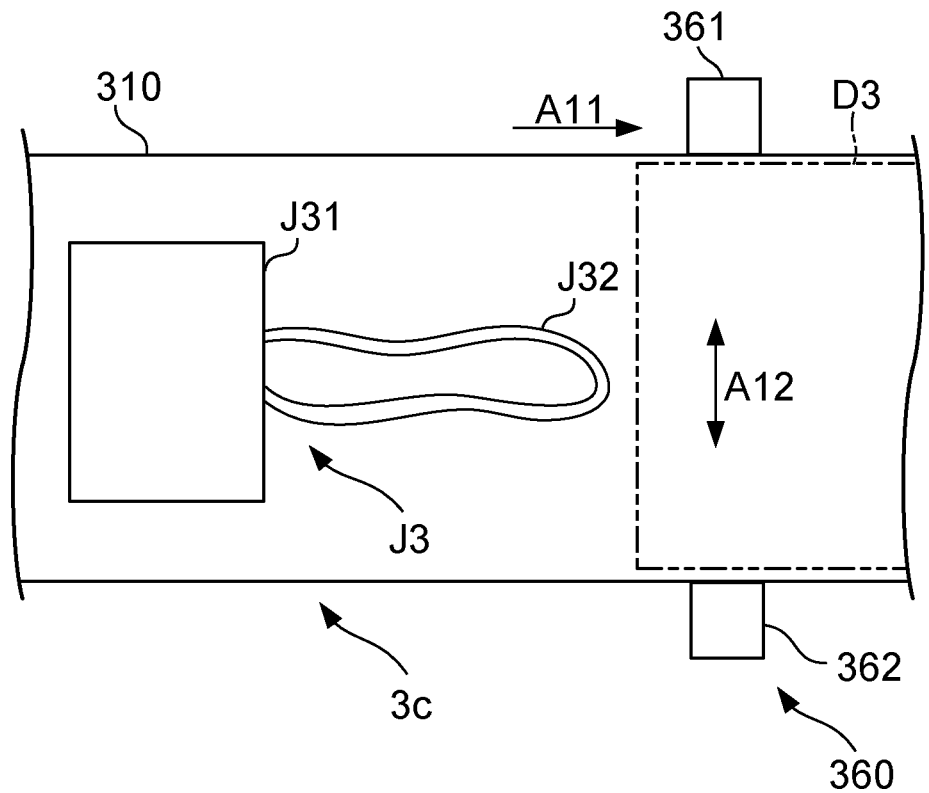
FIG. 24 shows an inspection system according to a modified example of the fourth embodiment.

FIG. 24 shows Inspection System 3c according to this modified example. As shown in FIG. 24, Inspection System 3c is equipped with Object Detection Sensor 360 in the upstream side of Visible-Light Image Shooting Area D3.

Object Detection Sensor 360 has Light Emitter 361 and Light Receiver 362. Light Emitter 361 and Light Receiver 362 are respectively located at one end and the other end of Conveyor 310 in Widthwise Direction A12 so that they face each other across the transport path of baggage. When Light Receiver 362 receives most of light emitted from Light Emitter 361, and an amplitude of signal output from Light Receiver 362 is greater than a predetermined threshold value, Object Detection Sensor 360 judges that no object is detected. When most of the light emitted by Light Emitter 361 is blocked by an object and an amplitude of signal output from Light Receiver 362 falls below the threshold value, Object Detection Sensor 360 judges that an object has been detected. Object Detection Sensor 360 detects baggage when it reaches a position downstream of Visible-Light Image Shooting Area D3.

In this modified example, Arrival-time Specifying Unit 344 specifies a first arrival time based on a period during which Object Detection Sensor 360 detects an object (hereinafter referred to as "detection period").

Figure 25:
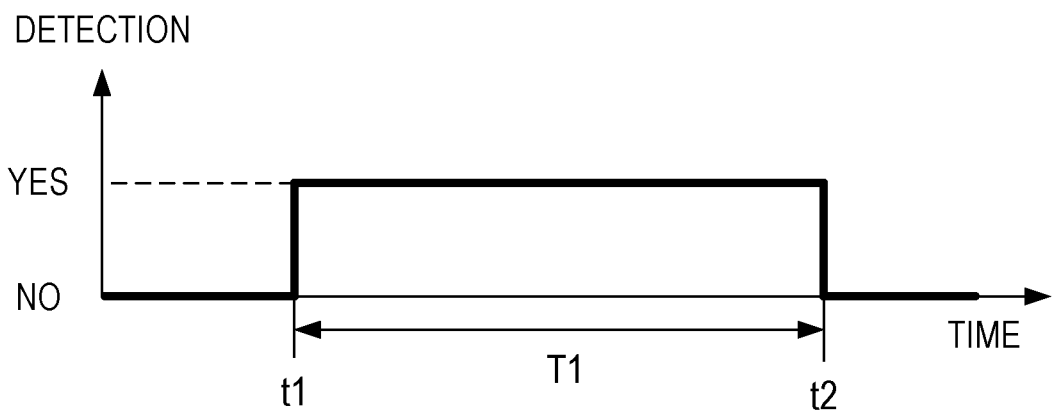
FIG. 25 shows an example of a graph indicating changes in a detection status of objects in the inspection system according to the modified example of the fourth embodiment.

FIG. 25 shows an example of a graph indicating changes in status of object detection performed by Object Detection Sensor 360. According to the graph shown in FIG. 25, Object Detection Sensor 360 detects an object in Detection Period T1 from Time t1 to Time t2.

Arrival-time Specifying Unit 344 specifies, for example, a time in the middle of Detection Period T1, i.e. a time when half of Detection Period T1 has elapsed from Time t1, as a first arrival time. For example, when baggage has a transparent portion or reflective portion, Arrival-time Specifying Unit 344 may fail to recognize the baggage from visible-light images. According to this modified example, even when it is difficult to recognize baggage from visible-light images, as far as the baggage is detected by Object Detection Sensor 360, a time when the baggage reaches Visible-light Image Shooting Area D3 can be specified.

Modified Example 4

A type of inspection performed by Inspection System 3 is not limited to that described in the third or fourth embodiment. For example, Inspection System 3 may perform inspections using millimeter waves or terahertz waves instead of x-rays to capture a transmitted-light image. Inspection System 3 may also perform inspections to detect liquids (suspected explosives) in baggage, inspections to trace explosive materials, etc.

Modified Example 5

In the above-described third and fourth embodiment, Inspection System 3 is used at an event venue. The place where Inspection System 3 is used is not limited to an event venue, and Inspection System 3 may be used at any place where it is necessary to ensure that a baggage held by a visitor who is entering the place does not contain any hazardous item. For example, Inspection System 3 may be used at entrances of airports, train stations, ports and bus terminals, concert venues, sports stadiums, museums, etc.

The invention claimed is:
1. An inspection system comprising:
an inspection device that inspects baggage transported by a belt conveyor,
a camera that uses visible light to capture an image of the baggage approaching the inspection device upstream of the inspection device in a transport direction of the belt conveyor, and
a transparent anti-reflective member that transmits visible light and reduces reflection of visible light, located upstream of the inspection device in the transport direction,
wherein
the camera captures an image of the baggage through the transparent anti-reflective member.

2. An inspection system according to claim 1, comprising:
a transparent cover that covers a portion of a belt of the belt conveyor upstream of the inspection device in the transport direction,
wherein
the transparent anti-reflective member is located on at least one of a top surface and a back surface of the transparent cover.

3. An inspection system according to claim 1, comprising:
a transparent cover that is located within a shooting range of the camera,
wherein
the transparent anti-reflective member is located on at least one of a top surface and a back surface of the transparent cover.

* * * * *